(12) United States Patent
Yabe

(10) Patent No.: US 9,488,812 B2
(45) Date of Patent: Nov. 8, 2016

(54) IMAGING OPTICS

(71) Applicant: Akira Yabe, Saitama (JP)

(72) Inventor: Akira Yabe, Saitama (JP)

( * ) Notice: Subject to any disclaimer, the term of this patent is extended or adjusted under 35 U.S.C. 154(b) by 0 days.

(21) Appl. No.: 14/762,865

(22) PCT Filed: Nov. 15, 2013

(86) PCT No.: PCT/JP2013/006714
§ 371 (c)(1),
(2) Date: Jul. 23, 2015

(87) PCT Pub. No.: WO2014/125533
PCT Pub. Date: Aug. 21, 2014

(65) Prior Publication Data
US 2015/0362712 A1    Dec. 17, 2015

(30) Foreign Application Priority Data
Feb. 15, 2013    (JP) ................. 2013-027423

(51) Int. Cl.
*G02B 15/167*    (2006.01)
*G02B 13/00*    (2006.01)
*H04N 5/232*    (2006.01)
*G02B 15/20*    (2006.01)

(52) U.S. Cl.
CPC .......... *G02B 15/167* (2013.01); *G02B 13/009* (2013.01); *H04N 5/23212* (2013.01); *G02B 15/20* (2013.01)

(58) Field of Classification Search
CPC .. G02B 15/167; G02B 15/20; G02B 21/025; G02B 21/04; G02B 23/2438; G02B 15/14
USPC ........ 359/379, 380, 422, 432, 676, 683, 689
See application file for complete search history.

(56) References Cited

U.S. PATENT DOCUMENTS

| 5,808,805 A | * | 9/1998 | Takahashi .............. G02B 17/08 355/53 |
| 2009/0207502 A1 | | 8/2009 | Cho |

FOREIGN PATENT DOCUMENTS

| JP | 2009192785 | 8/2009 |
| JP | 2010-077408 | 4/2010 |
| JP | 2010-134286 | 6/2010 |
| JP | 2011-007824 | 1/2011 |
| JP | 5145486 | 11/2012 |
| JP | 2013-033283 | 2/2013 |
| WO | WO2013/129274 | 9/2013 |

* cited by examiner

*Primary Examiner* — Scott J Sugarman
(74) *Attorney, Agent, or Firm* — Barnes & Thornburg LL; Jeffrey R. Stone

(57) ABSTRACT

To provide thin imaging optics that have magnification-adjustment functionality and can fit in a small-form-factor electronic device that has limited thickness or layout space. These imaging optics, which have magnification-adjustment functionality that allows magnification adjustment, are characterized in that a prism (P) with the ability to bend the optical axis by 90° is positioned on the object side. These imaging optics are also characterized in that at least the following are laid out, in this order, behind the optical-axis bending means: a positive-power first group (G1) that produces an intermediate image (II), said intermediate image (II) being a real image; a positive-power second group (G2) that refracts off-axis light rays toward a central axis (O); and a positive-power third group (G3) that focuses the intermediate image (II) onto an imaging element. Light-ray heights at the V-edges throughout the imaging optics are thereby kept low.

27 Claims, 14 Drawing Sheets

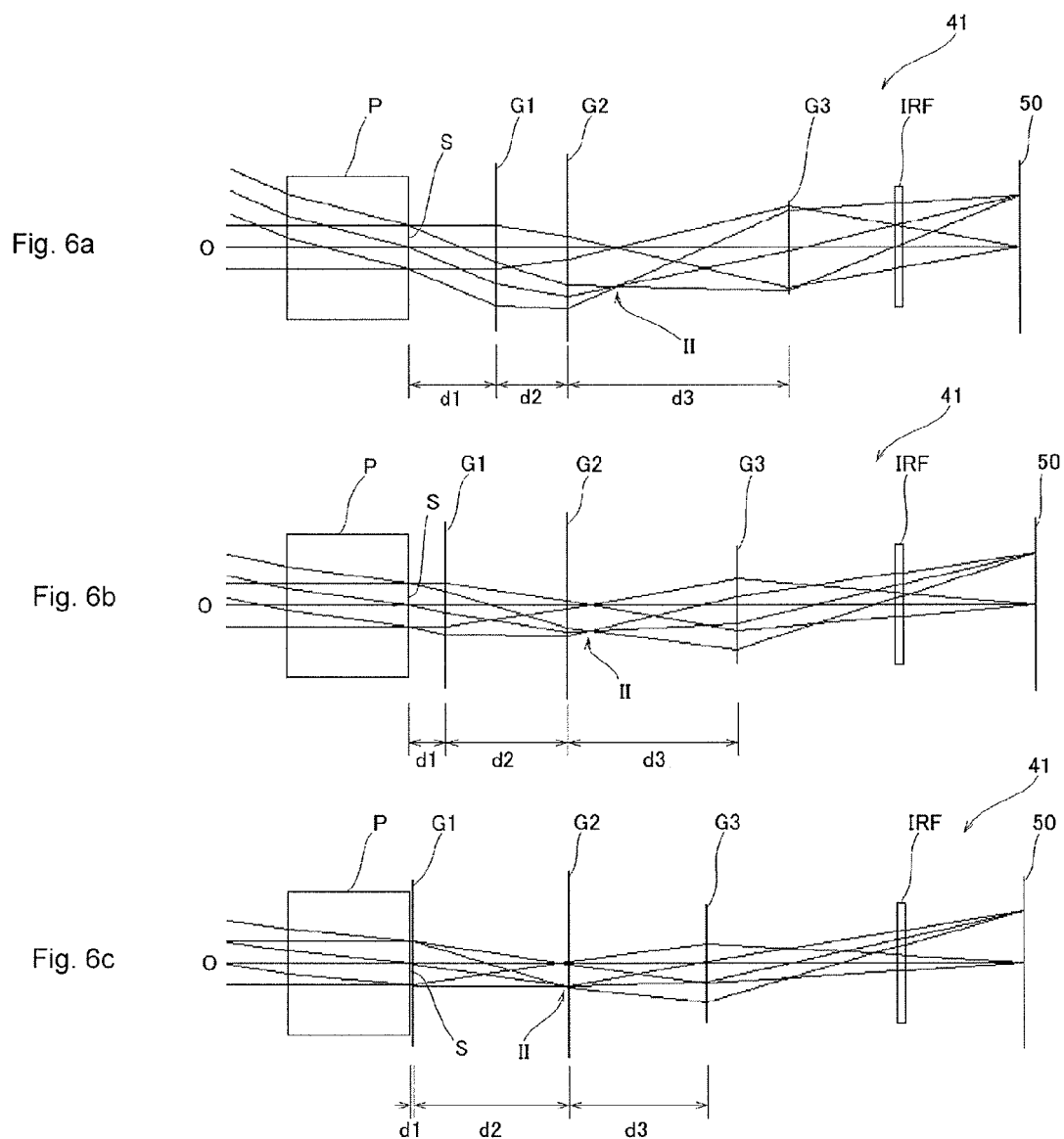

IMAGING OPTICS

FIELD OF THE INVENTION

The present invention relates to an imaging optical system that is embedded in a small and thin electronic device.

BACKGROUND OF THE INVENTION

For recent years, the number of small and thin electronic devices (hereafter called as small electronic devices) such as a mobile phone and a digital still camera which are equipped with a small imaging optical system has been growing. Most of small electronic devices are equipped with a fixed focus lens, because the space and the depth for the lens are limited. The fixed focus lens can be embedded in a small electronic device without a problem, because the overall length of the fixed focus lens can be controlled to about 5 mm. On the other hand, the overall length of a zoom lens with the zooming ratio of about 3 need to be about 20 mm. Therefore it is almost difficult to embed a zoom lens into a small electronic device in the straight configuration. Instead, the optical axis is usually bent 90 degrees by means of a prism or a mirror in order to embed a zoom lens in a small electronic device the space and the depth of which are limited.

For example, an imaging optical system is proposed in Reference 1, where the optical axis is bent 90 degrees by means of a prism. In the proposal of Reference 1, a prism with concave surfaces at the both side is used. By forming a concave surface at the front side of a prism, the ray height entering into the front surface of the prism can be kept low and the thickness of the prism can be kept small.

An imaging optical system is proposed in Reference 2, where a concave lens is included before a prism. In the proposal of Reference 2, by including a concave lens before a prism, the ray height entering into the front surface of the prism can be kept low and the thickness of the prism can be kept small, similarly to Reference 1.

In Reference 3, the rotation of a prism by 45 degrees during the storage is proposed to reduce the thickness during the storage. In Reference 4, an optical system without a concave surface at the front surface of a prism and without a concave lens before a prism is proposed.

REFERENCES CITED

JP Patent Documents

Reference 1: JP2003-43354
Reference 2: JP2004-37966
Reference 3: JP2007-86141
Reference 4: JP2007-155948

SUMMARY OF THE INVENTION

Problems to be Solved

As stated above, the optical axis of an imaging optical system which is embedded in a small electronic device is usually bent 90 degrees by means of a prism or a mirror, because the space and the depth for the optical system are limited. In addition, the ray height measured from the optical axis need to be kept low, because the small electronic devices are thin.

In order to solve these problems, a concave surface is sometimes formed at the entrance surface and or on the exit surface of a prism as Reference 1, or a concave lens is included before a prism as Reference 2. However, even with the inventions of Reference 1 or Reference 2, the problem remains that it is difficult to embed the imaging optical system into the space in a small electronic device, because of the thickness of a prism with a concave front surface or the thickness of a concave lens included before the prism, even if the ray height of the imaging optical system from the optical axis is kept low. For example, if a concave lens is included before a prism as Reference 2, according to a research of the applicant, the thickness of the concave lens is 1.2 mm and the thickness of the prism is 4 mm, altogether 5.2 mm for the sensor diagonal of 5.69 mm. Since the mechanical parts such as a lens barrel are necessary around the optical system, it is difficult to embed the imaging optical system including these mechanical parts in a small electronic device.

In order to solve this problem, in above-stated Reference 3, the rotation of a prism by 45 degrees during the storage is proposed to reduce the thickness during the storage. However, a problem of the invention of Reference 3 is that the high accuracy is required for the setting-up of the prism when the prism is rotated for the image-taking.

In above-stated Reference 4, an optical system without a concave surface at the front surface of a prism and without a concave lens before a prism is proposed. However, a problem of this imaging optical system is that the field angle is narrow at the wide end and the demand of the market cannot be fulfilled.

A method for keeping the size of a prism small without giving the optical power to the prism, or without including a concave lens before the prism is to locate the stop near the prism. However, a problem of locating the stop near the prism is that the lens diameter of the rear lens group becomes larger.

The purpose of the present invention is to provide an imaging optical system which has the function of the magnification adjustment and is thin in the direction of the object by keeping the ray height corresponding to the vertical edges (edges at the short side of the image sensor) low over the entire optical system.

Method to Solve the Problems

The imaging optical system of the present invention has the function of the magnification adjustment. This imaging optical system includes an optical axis bending means to bend the optical axis at the object side. In addition, the imaging optical system is characterized by comprising at least, the first lens group which has positive power and forms an intermediate real image, the second lens group which has positive power and refracts the off-axis ray bundles toward along the optical axis, and the third lens group which has positive power and relays the intermediate real image onto the image sensor, in order after the optical axis bending means.

Effect of the Invention

The present invention can realize an imaging optical system which is thin in the direction of the object by keeping the ray height corresponding to the vertical edges low over the entire optical system and which has the function of the magnification adjustment.

BRIEF DESCRIPTION OF THE DRAWINGS

FIG. 6(a) is a schematic diagram showing the paraxial relation at the wide end of the imaging optical system related to the fifth embodiment of the present invention, FIG. 6(b) is a schematic diagram showing the paraxial relation at the medium magnification, and FIG. 6(c) is a schematic diagram showing the paraxial relation at the telescopic end.

PREFERRED EMBODIMENTS OF THE PRESENT INVENTION

Figure 1A:
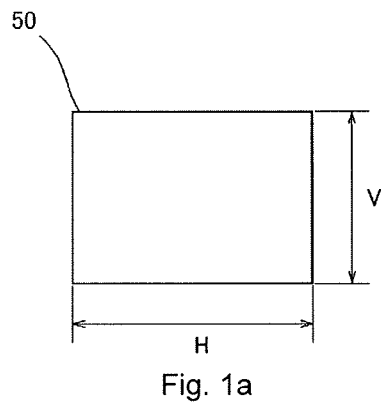
FIG. 1(a) is a schematic diagram of the image sensor related to the embodiments of the present invention and FIG. 1(b) is a schematic diagram showing the ray bundles on an arbitrary surface perpendicular to the optical axis of the imaging optical system.
Figure 1B:
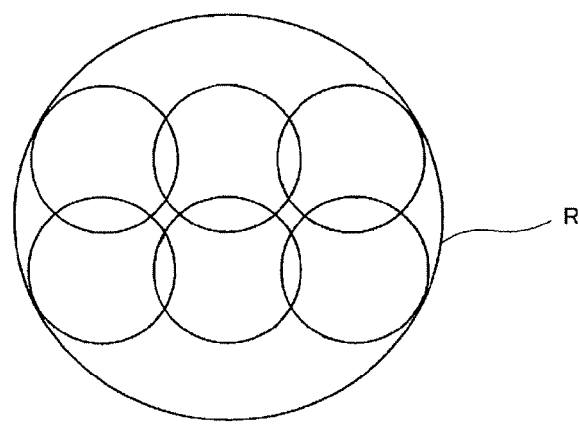

In the followings, the detail of the embodiments of the present invention is described with drawings. FIG. 1(a) shows the image sensor 50 which has the ratio of 3:4 between the vertical direction V (short side) and the horizontal direction H (long side). The edge of the vertical direction is called V-edge. The word V-edge means both of the entire side-line of the vertical direction and the middle point of the side-line of the vertical direction. Throughout the following description, the latter meaning is used. FIG. 1(b) shows the ray bundles corresponding to the four corners of the image sensor and the upper and lower V-edges. As is shown, the effective area on the optical surface is not rotationally symmetric. The vertical size of lens elements can be made small by removing the upper and lower portions which correspond to the vertical direction of the image sensor 50, instead of forming rotationally symmetrically. As FIG. 1(b) shows, the upper and lower boundaries of the ray bundles are not very different between four corners of the image sensor and the upper and lower V-edges. Therefore it is reasonable to consider that the vertical size of lens elements is determined by the upper and lower boundaries of the ray bundles which correspond to the V-edges. The ratio between the vertical direction and the horizontal direction of the image sensor 50 is 9:16 in the case of the high definition. Therefore, V:H is not restricted to the values of 3:4 or 9:16.

For imaging optical systems embedded in small electronic devices, the direction of the object and the vertical direction of the image sensor 50 are coincided, in order to make the thickness of the optical system in the direction of the object low. In other words, the ray bundles are usually bent 90 degrees by means of a prism or a mirror. When the direction of the object and the vertical direction of the image sensor 50 are coincided, the thickness of the optical system in the direction of the object is determined by the ray height of ray bundles corresponding to the V-edges from the optical axis. Therefore, the present invention is characterized by the function to keep the ray height of ray bundles corresponding to the V-edges from the optical axis low and to keep the thickness of the optical system in the direction of the object small. In the followings, the detail of this imaging optical system is described.

The imaging optical system related to the present embodiments is an optical system which has the function of the magnification adjustment (zooming function). This imaging optical system includes an optical axis bending means such as a prism or a mirror at the end of the object side (front side). In addition, the imaging optical system comprises at least, a lens group which has positive power and forms an intermediate real image, a lens group which has positive power and refracts the off-axis ray bundles toward along the optical axis, and a lens group which has positive power and relays the intermediate real image onto the image sensor, in order after the optical axis bending means.

The lens group which has positive power and refracts the off-axis ray bundles toward along the optical axis is located in the vicinity of the position where the intermediate image is formed. In the imaging optical system related to the present embodiments, the ray height is kept low over the entire optical system by forming the intermediate image before the ray height of the ray bundles emitted from a prism or a mirror becomes high and refracting the off-axis ray bundles toward along the optical axis in the vicinity of the position where the intermediate image is formed.

The principal ray which passes the center of the stop crosses the optical axis twice, because an intermediate image is formed. Therefore the stop can be located either before or after the above-stated intermediate image.

With the imaging optical system of the present embodiments, the ray height corresponding to the V-edges can be kept low. In general, if the ray height is lower than or equal to the vertical size of the image sensor at all surfaces, the thickness of the optical system (the thickness in the direction of the object) cannot be smaller. In other words, the ray height corresponding to the V-edges need not to be made smaller in the optical system, because the thickness of the optical system is determined by the vertical size of the image sensor. If the ray height corresponding to the V-edges can be kept low, the entire optical system can be made thin by removing the portion of the lens elements as much as the ray bundles corresponding to the V-edges are not obstructed.

With the imaging optical system of the present embodiments, the optical system can be made thin, without including a concave lens before an optical axis bending means or giving a negative optical power to the front surface of a prism as an optical axis bending means. Therefore, the present embodiments can realize the imaging optical system which can be embedded in small electronic devices with a limited space easily, because the optical system can be made thin, without including a concave lens of non-zero thickness or an optical axis bending means (prism) with more thickness.

In addition, with the imaging optical system of the present embodiments, the ray height corresponding to the V-edges can be kept low, because the intermediate image is formed before the ray height becomes high and the off-axis ray bundles are refracted toward along the optical axis, as is above stated. Then, a thin optical system can be realized by keeping the ray height corresponding to the V-edges low.

A lens group need not necessarily to include more than one lens elements. A lens group may include only one lens element, if the above-stated functions can be realized. In addition, the lens groups which realize the above-stated three functions need not necessarily to be independently moving lens groups for the magnification adjustment (zooming). One moving lens group may have more than one function, for example, the function to form an intermediate image and the function to refract the off-axis ray bundles toward along the optical axis. In addition, fixed lens groups may be included before (object side) or after (image side) the above-stated lens groups. In addition, thin optical part(s) such as a filter and a cover glass may be included before the optical axis bending means. Throughout the following descriptions, the object side is expressed as the front side and the image sensor side is expressed as the rear side.

First Embodiment

Figure 2A:
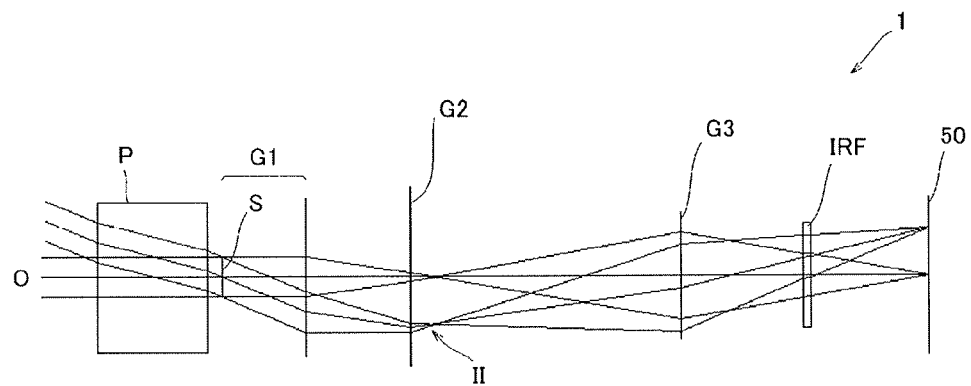
FIG. 2(a) is a schematic diagram showing the paraxial relation at the wide end of the imaging optical system related to the first embodiment of the present invention.
Figure 2B:
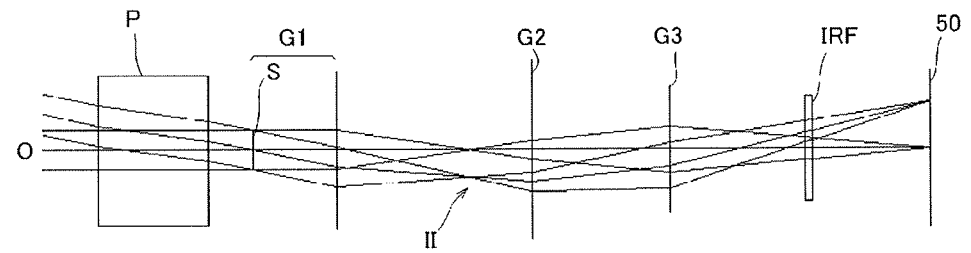
FIG. 2(b) is a schematic diagram showing the paraxial relation at the medium magnification.
Figure 2C:
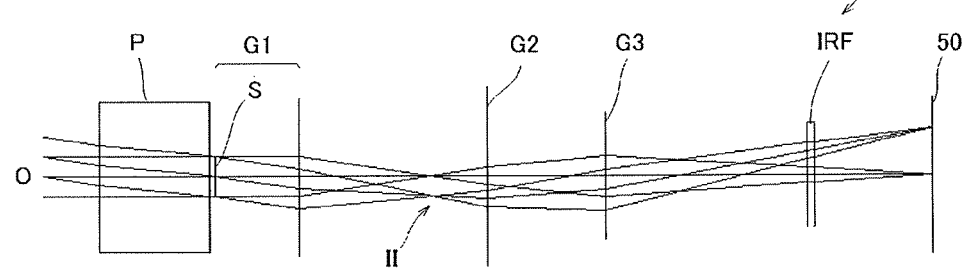
FIG. 2(c) is a schematic diagram showing the paraxial relation at the telescopic end.

FIG. 2 shows the paraxial relation of the imaging optical system 1 related to the first embodiment of the present invention. FIG. 2(a) is at the wide end, FIG. 2(b) is at the medium magnification, and FIG. 2(c) is at the telescopic end. In the following drawings, the paraxial rays which are projected to the center of the image sensor 50 and the paraxial rays corresponding to one V-edge are drawn.

As FIG. 2 shows, the imaging optical system 1 related to the first embodiment includes a prism P as an optical axis bending means at the front end and the first lens group G1 which comprises the stop S and a movable lens group which has positive power after the prism P. The imaging optical system 1 includes the second lens group G2 which has positive power and is movable after the first lens group G1 and the third lens group G3 which has positive power and is movable after the second lens group G2. The imaging optical system 1 includes an IR cut filter IRF after the third lens group G3 and an image sensor 50 such as CCD and CMOS after the IR cut filter IRF. FIG. 2 shows each of lens groups G1, G2, and G3 as one thin lens schematically. This is the same for FIG. 3, FIG. 4, FIG. 5 and FIG. 6 which are related to other embodiments. The purpose of these schematic diagrams is to show that each lens group has positive power, to show the approximate position of the intermediate image, to show if each lens group is movable or not, and to show the linking relation of lens groups. The optical power and the position of each lens group are not restricted to the drawings.

The prism P is an optical axis bending means which bends the ray bundles which enter from the entrance surface 90 degrees and emits them from the exit surface. On the drawing, the prism is drawn as a parallel plate in order to clarify the state of the ray bundles, but it is actually a prism which can bend the ray bundles. The optical axis bending means is not restricted to a prism but a mirror can be used. It is described below that the optical axis bending means is not restricted to a prism but a mirror can be used. This is the same for the second embodiment, the third embodiment, the fourth embodiment, and the fifth embodiment.

In the first lens group G1, the stop S is located near to the prism P and the distance between the stop S and the movable lens group which has positive power is fixed. This first lens group G1 has the function to form the intermediate image II and the intermediate image II is formed after the first lens group G1.

The second lens group G2 is located in the vicinity of the intermediate image II formed by the first lens group G1 and has the function to refract the off-axis ray bundles to the inner direction (toward along the central axis O). In addition, the second lens group G2 has the function to relay the intermediate image II formed by the first lens group G1. In other words, the second lens group G2 takes a part of the function to relay the intermediate image II.

The third lens group G3 is located at the nearest (among the first lens group G1, the second lens group G2, and the third lens group G3) to the image sensor 50 and has the function to concentrate the ray bundles refracted by the second lens group G2 onto the image sensor 50.

In the imaging optical system 1 of the present embodiment, the zooming is done by moving three lens groups, the first lens group G1, the second lens group G2, and the third lens group G3, along the optical axis and the focusing is done by moving the first lens group G1 along the optical axis. Therefore the imaging optical system 1 of the present embodiment has the function of the magnification adjustment and the function of the focal point adjustment.

The distribution of power of each lens group is considered as follows. For the imaging optical system 1, the total focal length is negative, because one intermediate image II exists. The magnification of the imaging by the second lens group G2 is about 1, because the second lens group G2 is located in the vicinity of the intermediate image II. The magnification of the imaging by the third lens group G3 is about −1 at the wide end, because the ratio of the height of the intermediate image II and the height of the final image is about −1 at the wide end. The focal length of the first lens group G1 has the similar value (of opposite sign) to the focal length of the total optical system at the wide end, because the focal length of the total optical system is the product of the focal length of the first lens group G1, the magnification of the imaging by the second lens group G2, and the magnification of the imaging by the third lens group G3.

The focal length of the second lens group G2 has the function to determine the entrance pupil position to the third lens group G3 and the exit pupil position of the total optical system is determined by the entrance pupil position to the third lens group G3. The exit pupil position of the total optical system affects the direction of the chief ray entering to the image sensor 50. Each type of the image sensor 50 has its condition of the direction of the chief ray entering to the image sensor 50. This means that there is wide possibility of the focal length of the second lens group G2. In addition, for optical systems which use many aspheres, the direction of the chief ray entering to the image sensor 50 at the peripheral area of the image plane is not uniquely determined by the paraxial exit pupil position. Also from this aspect, there is wide possibility of the focal length of the second lens group G2.

The focal length of the third lens group G3 has the function to determine the distance from the intermediate image II to the final image. If the focal length of the third lens group G3 becomes longer, the total lens length of the total optical system becomes longer. If the focal length of the third lens group G3 becomes shorter, the total lens length of the total optical system becomes shorter. The shorter total lens length of the total optical system is better, but the aberrations become larger, if the focal length of the third lens group G3 becomes shorter. Therefore the appropriate focal length of the third lens group G3 is determined by the balance between the demands on the size of the optical system and the image quality. In addition, the focal length of the third lens group G3 is affected by the function of the second lens group G2, because the second lens group G2 takes a part of the function to relay the intermediate image II.

From above-stated considerations, the conditions on the distribution of the power of each lens group are given as follows. The values on the Table 1 are values which are calculated by (focal length of each lens group(FGi))/|total focal length at the wide end(F)|, where the symbol | means the absolute value.

As is shown in Table 1, the value of the first lens group G1 is preferable between 0.5 and 3.0. The value of the second lens group G2 is preferable between 0.5 and infinity, in other words, more than 0.5. The value of the third lens group G3 is preferable between 0.5 and 1.5. The values are not necessarily restricted to these values of Table 1.

TABLE 1

|  | Min. | Max. |
|---|---|---|
| First lens group G1 | 0.5 | 3.0 |
| Second lens group G2 | 0.5 | INFINITY |
| Third lens group G3 | 0.5 | 1.5 |

With the imaging optical system 1 of the present embodiment, the ray height corresponding to the V-edges can be kept low, because the first lens group G1 forms the intermediate image and the second lens group G2 refracts the off-axis ray bundles to the inner direction. Therefore, with the present embodiment, the thin imaging optical system 1 which is thin in the direction of the object can be provided.

In addition, the imaging optical system 1 of the present embodiment has the large freedom of design, because three lens groups are moved for the zooming.

In the present embodiment, the stop S is located at the first lens group G1, but the location is not restricted to this position. As is stated above, there are two positions where the stop S can be located, because the intermediate image II is formed. Therefore, the stop S can be located on the first lens group G1 or on the rear surface of the prism P before the intermediate image II, or on the third lens group G3 after the intermediate image II.

The main difference of the effect between the case where the stop is located before the intermediate image II and the case where the stop is located after the intermediate image II is the difference of the amount of the change of FNO (the brightness of the optical system) in the case of zooming with the fixed value of the stop radius. In the case of zooming with the fixed value of the stop radius, the FNO becomes gradually larger (in other words, the optical system becomes darker) from the wide end to the telescopic end. In general, the amount of the change of FNO is smaller in the case where the stop is located after the intermediate image II than in the case where the stop is located before the intermediate image. How large amount of the change of FNO is preferable depends on the purpose and the application of each optical system, and the location of the stop is chosen according to these factors.

Second Embodiment

Figure 3A:
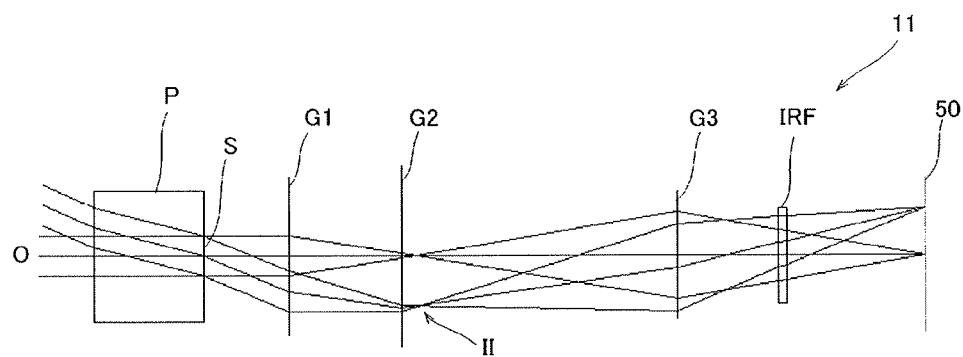
FIG. 3(a) is a schematic diagram showing the paraxial relation at the wide end of the imaging optical system related to the second embodiment of the present invention.
Figure 3B:
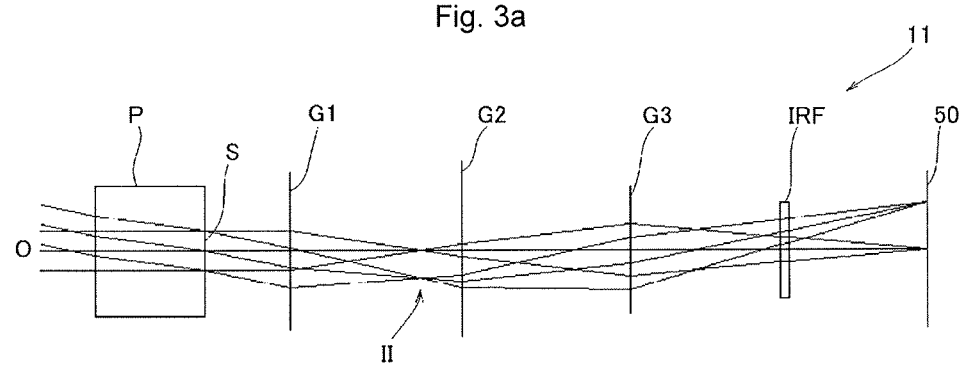
FIG. 3(b) is a schematic diagram showing the paraxial relation at the medium magnification.
Figure 3C:
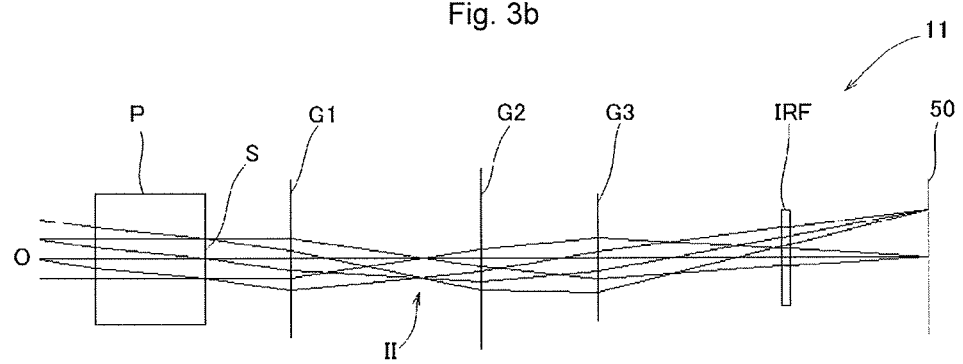
FIG. 3(c) is a schematic diagram showing the paraxial relation at the telescopic end.

FIG. 3 shows the paraxial relation of the imaging optical system 11 related to the second embodiment of the present invention. FIG. 3(a) is at the wide end, FIG. 3(b) is at the medium magnification, and FIG. 3(c) is at the telescopic end. The common entities to the above-stated first embodiment are given the same symbols and the duplicated explanations are omitted.

The above-stated first embodiment was characterized by moving three lens groups for the zooming, but the present embodiment is characterized by fixing one of three lens groups without using for zooming and simplifying the mechanism of the magnification adjustment. In other words, the imaging optical system related to the present embodiment is characterized by moving the first lens group G1 only for the focusing and not for the zooming. In the followings, the detail of the imaging optical system 11 related to the present embodiment is described.

As FIG. 3 shows, the imaging optical system 11 related to the present embodiment includes a prism P as an optical axis bending means at the front end and the stop S is formed at the rear surface of the prism P. The imaging optical system 11 includes the first lens group G1 which has positive power and is movable after the prism P, the second lens group G2 which has positive power and is movable, and the third lens group G3 which has positive power and is movable after the first lens group G1 in this order. The imaging optical system 11 includes an IR cut filter IRF and an image sensor 50 after the third lens group G3.

The first lens group G1 has the function to form the intermediate image II as the first embodiment and the intermediate image II is formed after the first lens group G1.

The second lens group G2 is located in the vicinity of the intermediate image II formed by the first lens group G1 and has the function to refract the off-axis ray bundles to the inner direction (toward along the central axis O) as the first embodiment. In addition, the second lens group G2 has the function to relay the intermediate image II formed by the first lens group G1. In other words, the second lens group G2 takes a part of the function to relay the intermediate image II.

The third lens group G3 is located at the nearest (among the first lens group G1, the second lens group G2, and the third lens group G3) to the image sensor 50 and has the function to concentrate the ray bundles refracted by the second lens group G2 onto the image sensor 50 as the first embodiment.

In the imaging optical system 11 of the present embodiment, the zooming is done by moving two lens groups, the second lens group G2 and the third lens group G3, along the optical axis and the focusing is done by moving the first lens group G1 along the optical axis. Therefore the imaging optical system 11 of the present embodiment has the function of the magnification adjustment and the function of the focal point adjustment, and the first lens group G1 is moved along the optical axis only for the focusing.

The conditions on the distribution of the power of each lens group (focal length of each lens group(FGi))/|total focal length at the wide end(F)| are given as follows. As is shown in Table 2, the value of the first lens group G1 is preferable between 0.5 and 3.0. The value of the second lens group G2 is preferable between 0.5 and infinity. The value of the third lens group G3 is preferable between 0.5 and 1.5. The values are not necessarily restricted to these values of Table 2.

TABLE 2

| | Min. | Max. |
|---|---|---|
| First lens group G1 | 0.5 | 3.0 |
| Second lens group G2 | 0.5 | INFINITY |
| Third lens group G3 | 0.5 | 1.5 |

With the imaging optical system 11 of the present embodiment, the ray height corresponding to the V-edges can be kept low, because the first lens group G1 forms the intermediate image and the second lens group G2 refracts the off-axis ray bundles to the inner direction. Therefore, with the present embodiment, the thin imaging optical system 11 which is thin in the direction of the object can be provided. The imaging optical system 11 related to the present embodiment has an advantage that the control of the focusing can be simplified because the focusing is separated from the zooming.

In the present embodiment, the stop S is located at the rear surface of the prism P, but the location is not restricted to this position. As is stated above, there are two positions where the stop S can be located, because the intermediate image II is formed. Therefore, the stop S can be located on the first lens group G1 or on the rear surface of the prism P before the intermediate image II, or on the third lens group G3 after the intermediate image II.

Third Embodiment

Figure 4A:
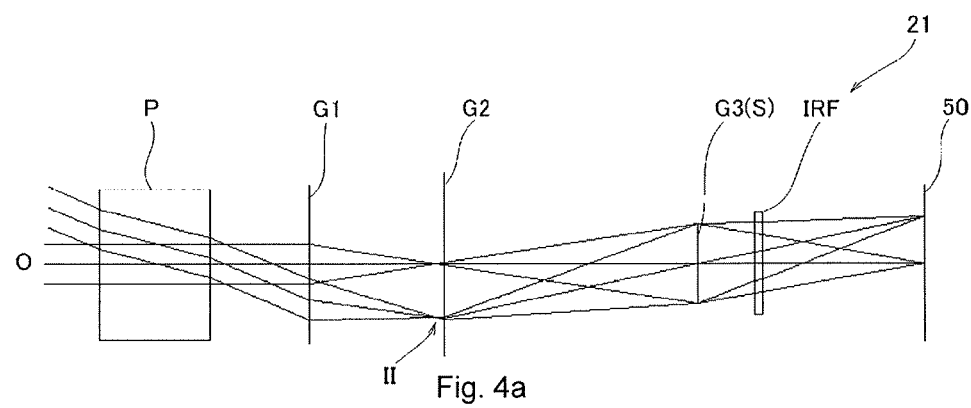
FIG. 4(a) is a schematic diagram showing the paraxial relation at the wide end of the imaging optical system related to the third embodiment of the present invention.
Figure 4B:
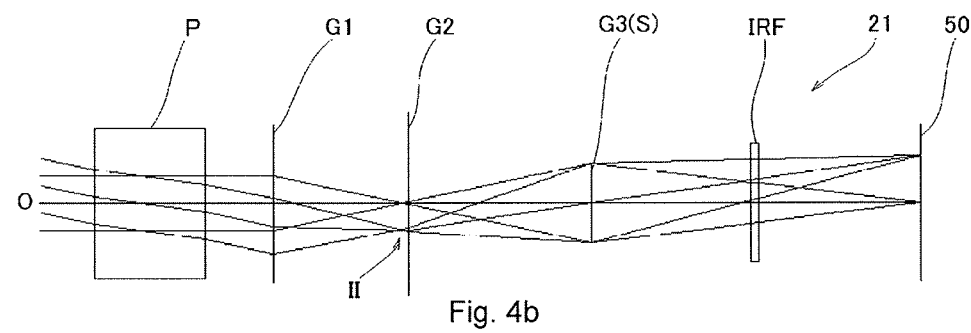
FIG. 4(b) is a schematic diagram showing the paraxial relation at the medium magnification.
Figure 4C:
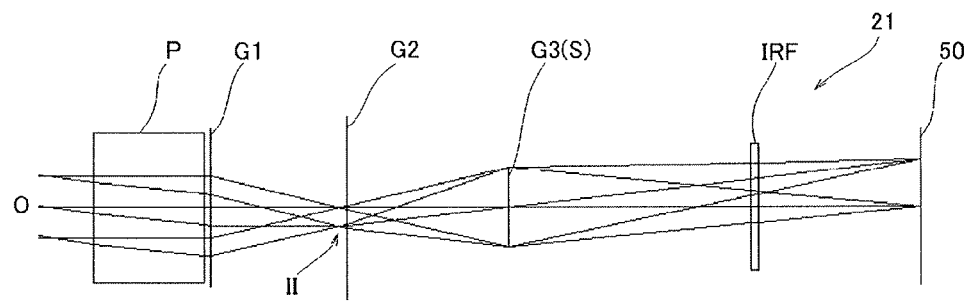
FIG. 4(c) is a schematic diagram showing the paraxial relation at the telescopic end.

FIG. 4 shows the paraxial relation of the imaging optical system 21 related to the third embodiment of the present invention. FIG. 4(a) is at the wide end, FIG. 4(b) is at the medium magnification, and FIG. 4(c) is at the telescopic end. The common entities to the above-stated other embodiments are given the same symbols and the duplicated explanations are omitted. The imaging optical system 21 related to the present embodiment is characterized by linking two lens groups of three lens groups and moving as one body. In other words, the present embodiment is characterized by linking the first lens group G1 and the second lens group G2. In the followings, the detail of the imaging optical system 21 related to the present embodiment is described.

As FIG. 4 shows, the imaging optical system 21 related to the present embodiment includes a prism P as an optical axis bending means at the front end. The imaging optical system 21 includes the first lens group G1 and the second lens group G2 which have positive power and are movable after the prism P, and the third lens group G3 which has positive power and is movable after the second lens group G2. The first lens group G1 and the second lens group G2 construct the front lens group GF and the third lens group G3 constructs the rear lens group GF. The imaging optical system 21 includes an IR cut filter IRF and an image sensor 50 after the third lens group G3 (rear lens group GR).

The first lens group G1 has the function to form the intermediate image II as the first embodiment and the second embodiment and the intermediate image II is formed after the first lens group G1. The second lens group G2 is located in the vicinity of the intermediate image II formed by the first lens group G1 and has the function to refract the off-axis ray bundles to the inner direction (toward along the central axis O) as the above-stated first embodiment and the above-stated second embodiment. The second lens group G2 has the function to relay the intermediate image II formed by the first lens group G1 as the above-stated other embodiments. In other words, the second lens group G2 takes a part of the function to relay the intermediate image 11.

The third lens group G3 (rear lens group GR) is located at the nearest (among the first lens group G1, the second lens group G2, and the third lens group G3) to the image sensor 50 and has the function to concentrate the ray bundles refracted by the second lens group G2 onto the image sensor 50 as the above-stated other embodiments. In addition, the stop S is located at the third lens group G3 in the present embodiment.

The imaging optical system 21 related to the present embodiment comprises the front lens group GF which consists of the first lens group G1 and the second lens group G2, and the rear lens group GR which consists of the third lens group G3. The front lens group has the function to form the intermediate image, the function to refract the off-axis lens group to the inner direction, and a part of the function to relay the intermediate image II. It was explained that the front lens group consists of the first lens group G1 and the second lens group G2, but it is not necessary to distinguish the first lens group G1 and the second lens group G2 clearly in the practical optical systems. In other words, it is enough that the front lens group GR which has the function to form the intermediate image II and the function to refract the off-axis ray bundles to the inner direction, and the rear lens group GR which relays the intermediate image II onto the image sensor 50.

In the imaging optical system 21 of the present embodiment, the zooming is done by moving the front lens group GF which consists of the first lens group G1 and the second lens group G2 and the rear lens group GR which consists of the third lens group G3 along the optical axis and the focusing is done by moving the whole of the front lens group GF along the optical axis. Therefore the imaging optical system 21 of the present embodiment has the function of the magnification adjustment and the function of the focal point adjustment.

The conditions on the distribution of the power of each lens group (focal length of each lens group(FGi))/|total focal length at the wide end(F)| are given as follows. As is shown in Table 3, the value of the front lens group GF is preferable between 0.5 and 3.0. The value of the rear lens group GR is preferable between 0.5 and 1.5. The values are not necessarily restricted to these values of Table 3.

TABLE 3

|  | Min. | Max. |
| --- | --- | --- |
| Front lens group G1 | 0.5 | 3.0 |
| Rear lens group G3 | 0.5 | 1.5 |

With the imaging optical system 21 of the present embodiment, the thin imaging optical system 21 which is thin in the direction of the object can be provided, because the front lens group GF forms the intermediate image and refracts the off-axis ray bundles to the inner direction, therefore the ray height corresponding to the V-edges can be kept low. The imaging optical system 21 related to the present embodiment has an advantage that the mechanism can be simplified because the number of the moving lens groups is two.

In the present embodiment, the stop S is located at the third lens group G3, but the location is not restricted to this position. As is stated above, there are two positions where the stop S can be located, because the intermediate image II is formed. Therefore, the stop S can be located on the first lens group G1 or on the rear surface of the prism P before the intermediate image II, or on the third lens group G3 after the intermediate image II.

Fourth Embodiment

Figure 5A:
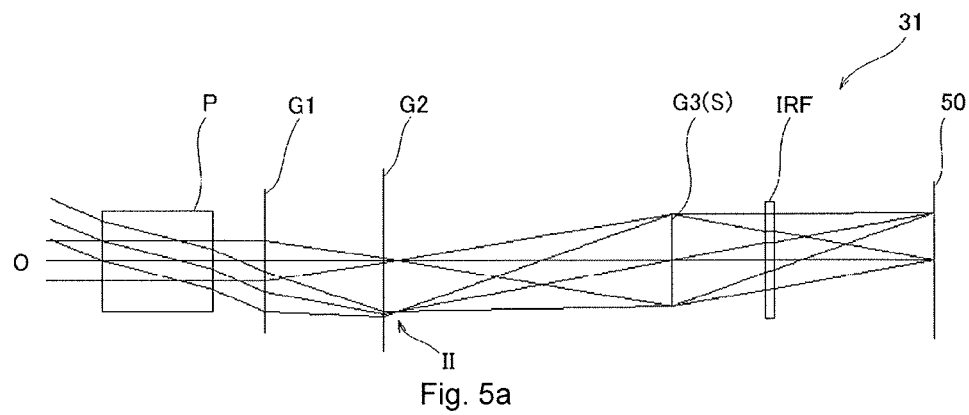
FIG. 5(a) is a schematic diagram showing the paraxial relation at the wide end of the imaging optical system related to the fourth embodiment of the present invention.
Figure 5B:
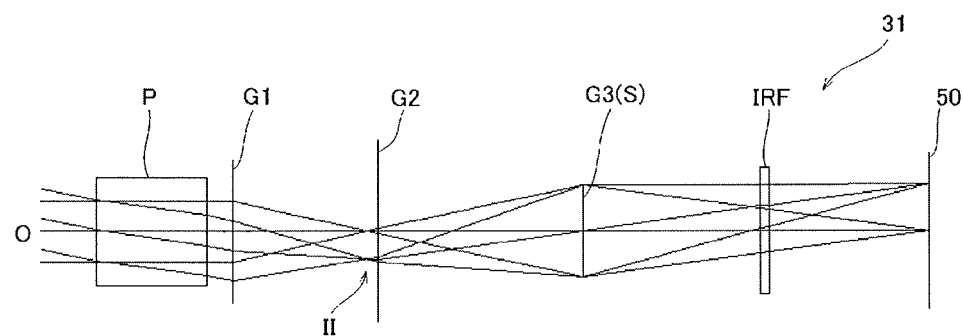
FIG. 5(b) is a schematic diagram showing the paraxial relation at the medium magnification.
Figure 5C:
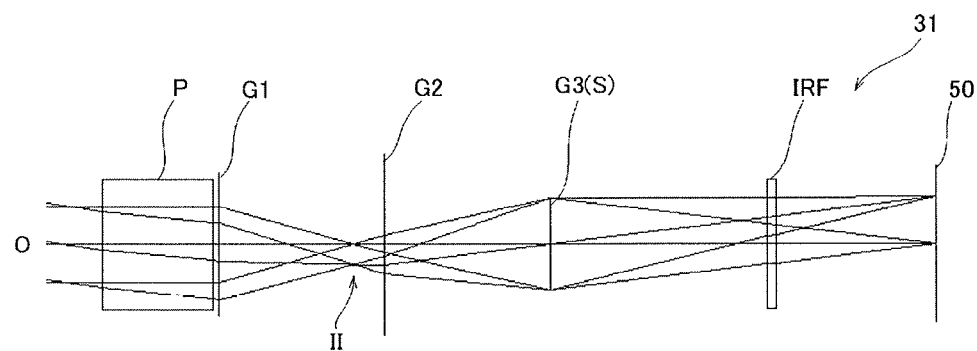
FIG. 5(c) is a schematic diagram showing the paraxial relation at the telescopic end.

FIG. 5 shows the paraxial relation of the imaging optical system 31 related to the fourth embodiment of the present invention. FIG. 5(*a*) is at the wide end, FIG. 5(*b*) is at the medium magnification, and FIG. 5(*c*) is at the telescopic end. The common entities to the above-stated other embodiments are given the same symbols and the duplicated explanations are omitted. The imaging optical system 31 related to the present embodiment is characterized by simplifying the mechanism of the magnification adjustment by fixing the second lens group G2. In the followings, the detail of the imaging optical system 31 related to the present embodiment is described.

As FIG. 5 shows, the imaging optical system 31 related to the present embodiment includes a prism P as an optical axis bending means at the front end. The imaging optical system 31 includes the first lens group G1 which has positive power and is movable after the prism P, the second lens group G2 which has positive power and is a fixed lens group after the first lens group G1, and the third lens group G3 which has positive power and is movable after the second lens group G2. The imaging optical system 31 includes an IR cut filter IRF and an image sensor 50 after the third lens group G3.

The first lens group G1 has the function to form the intermediate image II as the above-stated other embodiments and the intermediate image II is formed after the first lens group G1.

The second lens group G2 of the present embodiment is fixed. The second lens group G2 is located in the vicinity of the intermediate image II formed by the first lens group G1 and has the function to refract the off-axis ray bundles to the inner direction (toward along the central axis O) as the above-stated other embodiments. The second lens group G2 has the function to relay the intermediate image II formed by the first lens group G1. In other words, the second lens group G2 takes a part of the function to relay the intermediate image II.

The third lens group G3 is located at the nearest (among the first lens group G1, the second lens group G2, and the third lens group G3) to the image sensor 50 and has the function to concentrate the ray bundles refracted by the second lens group G2 onto the image sensor 50 as the above-stated other embodiments. In addition, the stop S is located at the third lens group G3 in the present embodiment.

In the imaging optical system 31 of the present embodiment, the zooming is done by moving the first lens group G1 and the third lens group G3 along the optical axis and the focusing is done by moving the first lens group G1 along the optical axis. Therefore the imaging optical system 31 of the present embodiment has the function of the magnification adjustment and the function of the focal point adjustment.

The conditions on the distribution of the power of each lens group (focal length of each lens group(FGi))/|total focal length at the wide end(F)| are given as follows. As is shown in Table 4, the value of the first lens group G1 is preferable between 0.5 and 3.0. The value of the second lens group G2 is preferable between 0.5 and infinity. The value of the third lens group G3 is preferable between 0.5 and 1.5. The values are not necessarily restricted to these values of Table 4.

TABLE 4

|  | Min. | Max. |
| --- | --- | --- |
| First lens group G1 | 0.5 | 3.0 |
| Second lens group G2 | 0.5 | INFINITY |
| Third lens group G3 | 0.5 | 1.5 |

With the imaging optical system 31 of the present embodiment, the thin imaging optical system 31 which is thin in the direction of the object can be provided, because the first lens group G1 forms the intermediate image and the second lens group G2 refracts the off-axis ray bundles to the inner direction, therefore the ray height corresponding to the V-edges can be kept low. The imaging optical system 31 related to the present embodiment has an advantage that the mechanism can be simplified because the number of the moving lens groups is two and an advantage that the weight of the moving groups is small because the second lens group G2 is fixed.

In the present embodiment, the stop S is located at the third lens group G3, but the location is not restricted to this position. As is stated above, there are two positions where the stop S can be located, because the intermediate image II is formed. Therefore, the stop S can be located on the first lens group G1 or on the rear surface of the prism P before the intermediate image II, or on the third lens group G3 after the intermediate image II.

Fifth Embodiment

FIG. 6 shows the paraxial relation of the imaging optical system 41 related to the fifth embodiment of the present invention. FIG. 6(a) is at the wide end, FIG. 6(b) is at the medium magnification, and FIG. 6(c) is at the telescopic end. The common entities to the above-stated other embodiments are given the same symbols and the duplicated explanations are omitted. The imaging optical system 41 related to the present embodiment is characterized by simplifying the mechanism of the magnification adjustment by linking the first lens group G1 and the third lens group G3 during the zooming. In addition, the imaging optical system 41 related to the present embodiment is characterized by fixing the second lens group G2.

As FIG. 6 shows, the imaging optical system 41 related to the present embodiment includes a prism P as an optical axis bending means at the front end. The imaging optical system 41 includes the first lens group G1 which has positive power and is movable after the prism P, the second lens group G2 which has positive power and is a fixed lens group after the first lens group G1, and the third lens group G3 which has positive power and is movable after the second lens group G2. The imaging optical system 41 includes an IR cut filter IRF and an image sensor 50 after the third lens group G3.

The first lens group G1 has the function to form the intermediate image II as the above-stated other embodiments and the intermediate image II is formed after the first lens group G1.

The second lens group G2 of the present embodiment is fixed. The second lens group G2 is located in the vicinity of the intermediate image II formed by the first lens group G1 and has the function to refract the off-axis ray bundles to the inner direction (toward along the central axis O) as the above-stated other embodiments. The second lens group G2 has the function to relay the intermediate image 11 formed by the first lens group G1. In other words, the second lens group G2 takes a part of the function to relay the intermediate image II.

The third lens group G3 is located at the nearest (among the first lens group G1, the second lens group G2, and the third lens group G3) to the image sensor 50 and has the function to concentrate the ray bundles refracted by the second lens group G2 onto the image sensor 50 as the above-stated other embodiments.

In the imaging optical system 41 of the present embodiment, the zooming is done by linking and moving the first lens group G1 and the third lens group G3 along the optical axis. In this case, the best image position shifts a little during the zooming, but the sharp image can be achieved with the use of EDoF (Extended Depth of Field) technology. EDoF is an image processing technology which extends the depth of field. In addition, the moving group for the focusing is not necessary, because the EDoF technology is used.

The conditions on the distribution of the power of each lens group (focal length of each lens group(FGi))/|total focal length at the wide end(F)| are given as follows. As is shown in Table 5, the value of the first lens group G1 is preferable between 0.5 and 3.0. The value of the second lens group G2 is preferable between 0.5 and infinity. The value of the third lens group G3 is preferable between 0.5 and 1.5. The values are not necessarily restricted to these values of Table 5.

TABLE 5

|  | Min. | Max. |
| --- | --- | --- |
| First lens group G1 | 0.5 | 3.0 |
| Second lens group G2 | 0.5 | INFINITY |
| Third lens group G3 | 0.5 | 1.5 |

With the imaging optical system 41 of the present embodiment, the thin imaging optical system 41 which is thin in the direction of the object can be provided, because the first lens group G1 forms the intermediate image and the second lens group G2 refracts the off-axis ray bundles to the inner direction, therefore the ray height corresponding to the V-edges can be kept low. The imaging optical system 41 related to the present embodiment has an advantage that the control of the moving parts is easy because the second lens group G2 is fixed and the first lens group G1 and the third lens group G3 are linked and moved.

In the present embodiment, the stop S is located at the rear surface of the prism P, but the location is not restricted to this position. As is stated above, there are two positions where the stop S can be located, because the intermediate image II is formed. Therefore, the stop S can be located on the first lens group G1 or on the rear surface of the prism P before the intermediate image II, or on the third lens group G3 after the intermediate image II.

Common to all Embodiments

In the above, five embodiments were described. One way of simplification of the mechanism of the magnification change is to fix one lens group. In the second embodiment, the first lens group G1 is fixed. And in the fourth embodiment, the second lens group G2 is fixed. Another way of simplification of the mechanism of the magnification change is to link two lens groups. In the third embodiment, the first lens group G1 and the second lens group G2 are linked, and in the fifth embodiment, the first lens group G1 and the third lens group G3 are linked.

As remaining possibility of simplification of the mechanism of the magnification change, the case where the third lens group G3 is fixed and the case where the second lens group G2 and the third lens group G3 are linked can be considered. But fixing the third lens group G3 is inappropriate because the third lens group G3 has the function of the variator and linking the second lens group G2 and the third lens group G3 is inappropriate because it is difficult to keep the ray height corresponding to the V-edges low. In addition, related to the fifth embodiment, the embodiment where the second lens group G2 is moved for the zooming without using the EDoF technology is possible. But the existence of such embodiment is trivial from the fifth embodiment.

On the other hand, contrary to the simplification of the mechanism of the magnification change, it can be considered to divide a part or all of lens groups in the above-stated five embodiments and move them in the mechanism of the magnification change. With such a method, the image quality can be improved on the price of the increased cost and or the increased weight. Such complicated mechanisms of the magnification change which are derived from the division of lens groups are included in the context of the above-stated five embodiments.

EXAMPLES

In the followings, the concrete lens construction of imaging optical systems 1, 11, 21, 31, 41 related to the above-stated first, second, third, fourth, and fifth embodiments is described. The purpose of the lens construction of the following examples is to show the above-stated first, second, third, fourth, and fifth embodiments are effective to realize the thin imaging optical system which is thin in the direction of the object, but the lens construction is not restricted to the following examples, because there can be many other constructions than the examples.

Example 1

Figure 7A:
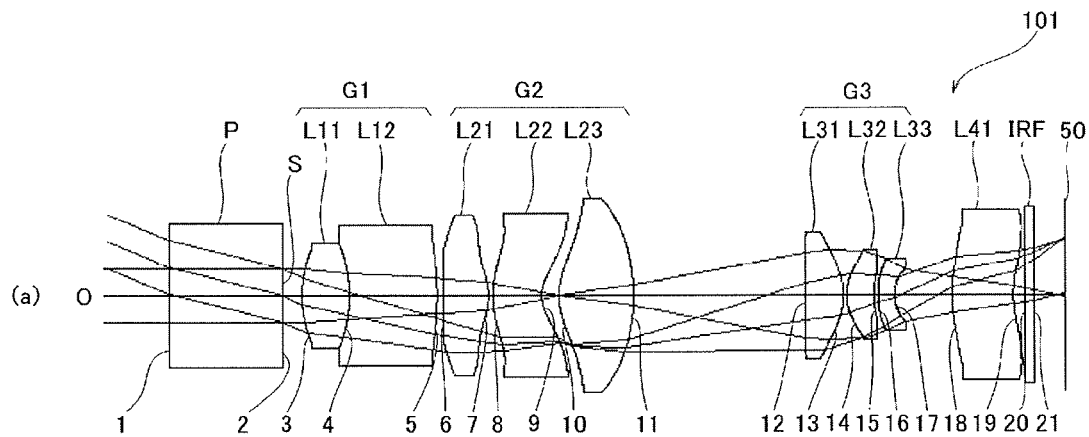
FIG. 7(a) is a section drawing at the wide end of the imaging optical system corresponding to the first example of the present invention.
Figure 7B:
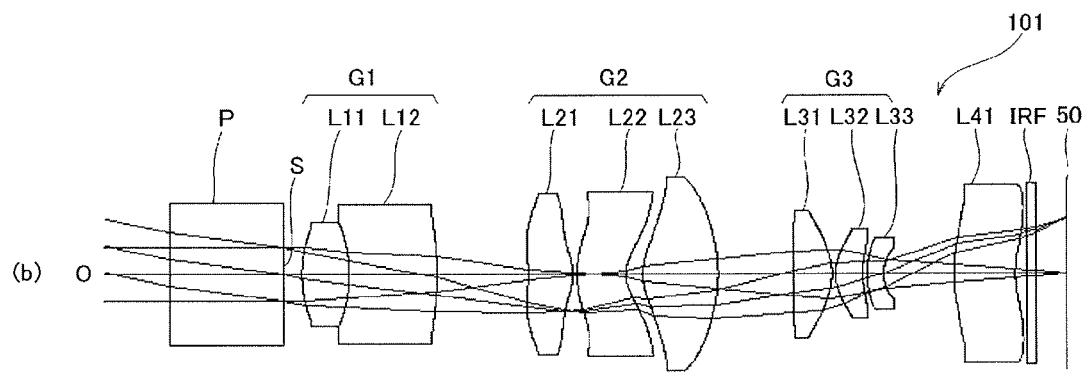
FIG. 7(b) is a section drawing at the medium magnification.
Figure 7C:
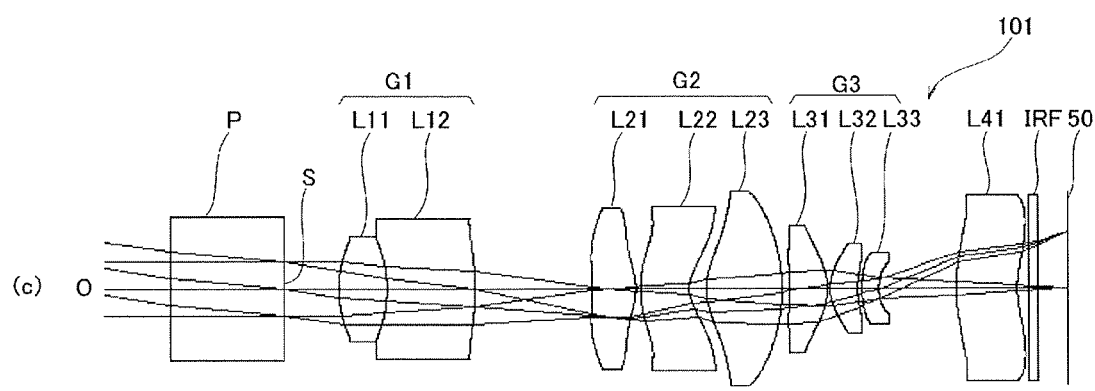
FIG. 7(c) is a section drawing at the telescopic end.

FIG. 7 shows the section drawing of the imaging optical system 101. The clear aperture of each lens corresponds to the ray bundle at the full field. The ray bundle which is projected to the center of the image sensor 50 and the ray bundle corresponding to a V-edge are drawn. The imaging optical system 101 is an example of the imaging optical system 1 related to the first embodiment.

As FIG. 7 shows, the imaging optical system of the present example includes the first lens group G1, the second lens group G2, and the third lens group G3, which have positive power and are movable, after the prism P. A fixed lens L41 is located after the third lens group G3, and the IR cut filter IRF and the image sensor 50 are located after the fixed lens L41 in this order. The stop S is formed after the prism P.

The first lens group G1 comprises a cemented doublet of the first lens L11 which is convex at both surfaces and the second lens L12 which is meniscus with the front concave surface and the rear convex surface.

The second lens group G2 comprises the third lens L21 which is meniscus with the front concave surface and the rear convex surface, the fourth lens L22 which is meniscus with the front convex surface and the rear concave surface, and the fifth lens L23 which is convex at both surfaces.

The third lens group G3 comprises the sixth lens L31 which is meniscus with the front concave surface and the rear convex surface, the seventh lens L32 which is meniscus with the front convex surface and the rear concave surface, and the eighth lens L33 which is meniscus with the front convex surface and the rear concave surface.

The fixed lens L41 is meniscus with the front convex surface and the rear concave surface. All lenses of the first lens group G1, the second lens group G2, the third lens group G3 and the fixed lens L41 are aspheres except for the cemented surface 4.

In the imaging optical system 101, the zooming is done by moving the first lens group G1, the second lens group G2, and the third lens group G3, and the focusing is done by moving the first lens group G1.

The following Table 6 shows the specification of the imaging optical system 101 shown at FIG. 7. In Table 6, $\omega$ in the total specification means the half field angle at the wide end, and FNO means the value of (focal length)/(entrance pupil diameter) and means the brightness of the optical system. In the optical system of the example, the stop radius is fixed during the zooming. Therefore the FNO changes with the zooming. FNO in the table is the value at the wide end. F means the focal length of the total system at the wide end and Y means the largest image height. The sign of the focal length of the total system at the wide end is minus, because the intermediate image is formed in the present invention. L means the total length of the imaging optical system 101 (the distance from the front surface of the prism to the image surface when the prism is developed at the reflecting surface). m in the lens data means the surface number from the object side (from the front end) which corresponds to the number on FIG. 7(a), r means the radius of curvature of each optical surface, and d means the axial distance from each optical surface to the next optical surface. Nd means the refractive index at the d-line ($\lambda$=587.6 nm) and Vd means the Abbe number at the d-line. FGi/|F| means (focal length of each lens group(FGi))/|total focal length at the wide end(F)|. The definition of the aspheric coefficients are shown at Eq (1).

Eq(1)

$$z = \frac{ch^2}{\sqrt{1+(1+K)c^2h^2}} + Ah^4 + Bh^6 + Ch^8 + Dh^{10} + Eh^{12} + Fh^{14} \quad (1)$$

where, z is the sag to the z axis (from the surface top) at the height h,
h is the height perpendicular to the z axis ($h^2=x^2+y^2$),
c is the paraxial curvature (=1/radius of curvature),
A, B, C, D, E, F are the aspheric coefficients of fourth, sixth, eighth, tenth, twelfth, and fourteenth orders respectively, and K is the conic constant.
W in the group separation means the wide end, M means the medium magnification, and T means the telescope end.

TABLE 6

Total specification
2 $\omega$ = 70°
Image size = 4.552 mm × 3.414 mm (Y = 2.845 mm)
FNO = 2.4
Zooming ratio = 2.8
F = −4.063 mm
L = 26.92 mm
Maximum ray height corresponding to the V-edge = 3.4 mm

| Lens data | | | | |
|---|---|---|---|---|
| m | r | d | nd | Vd |
| 1 | INFINITY | 3.4000000 | 1.51680 | 64.20 |
| 2 | INFINITY | 0.6017373 | | |
| 3 | 3.3566724 | 1.4381623 | 1.49700 | 81.61 |
| 4 | −4.0098956 | 2.6325521 | 1.64769 | 33.84 |
| 5 | 7.4836021 | 0.2125802 | | |
| 6 | −6.0333656 | 1.3220721 | 1.59201 | 67.02 |
| 7 | −1.6671657 | 0.1374810 | | |
| 8 | 3.2767314 | 1.4596985 | 1.84666 | 23.78 |
| 9 | 0.8197137 | 0.5179634 | | |

TABLE 6-continued

| | | | | |
|---|---|---|---|---|
| 10 | 1.6177176 | 2.2719648 | 1.63854 | 55.45 |
| 11 | −4.8328802 | 5.1742651 | | |
| 12 | −18.0491558 | 1.1384586 | 1.49700 | 81.61 |
| 13 | −1.7777505 | 0.0999860 | | |
| 14 | 1.4688631 | 0.8122264 | 1.56907 | 71.30 |
| 15 | 1.8766719 | 0.1363150 | | |
| 16 | 4.9994891 | 0.4999910 | 1.84666 | 23.78 |
| 17 | 1.6428635 | 1.6954327 | | |
| 18 | 3.7928310 | 1.8395681 | 1.72916 | 54.67 |
| 19 | 3.3606612 | 0.3270049 | | |
| 20 | INFINITY | 0.3000000 | 1.51680 | 64.20 |
| 21 | INFINITY | 0.8998775 | | |

Aspheric coefficients

| m | K | A | B | C | D | E | F |
|---|---|---|---|---|---|---|---|
| 3 | −8.02E+00 | 2.77E−02 | −1.15E−02 | 6.62E−03 | −2.61E−03 | 5.66E−04 | −5.17E−05 |
| 5 | −1.80E+01 | −9.66E−04 | 3.89E−04 | 4.52E−04 | −1.37E−04 | 1.81E−05 | −7.92E−07 |
| 6 | 5.21E−01 | 5.71E−02 | −7.87E−03 | 2.44E−04 | 4.42E−05 | −3.31E−06 | −4.02E−08 |
| 7 | −3.40E+00 | 6.48E−02 | −6.52E−03 | −2.66E−03 | 7.10E−04 | −6.39E−05 | 1.97E−06 |
| 8 | −4.73E−01 | −1.11E−02 | 5.10E−03 | −4.50E−03 | 1.04E−03 | −1.01E−04 | 3.68E−06 |
| 9 | −3.85E+00 | 2.42E−03 | −1.08E−02 | 2.89E−03 | −3.56E−04 | 2.25E−05 | −5.78E−07 |
| 10 | −6.48E+00 | 8.83E−03 | −5.50E−03 | 9.69E−04 | −8.63E−05 | 4.09E−06 | −8.78E−08 |
| 11 | −9.32E−01 | 1.45E−02 | 2.38E−04 | −1.35E−04 | 1.36E−05 | −7.88E−07 | 1.23E−08 |
| 12 | −6.98E−01 | 2.81E−02 | −1.63E−02 | 7.35E−03 | −1.84E−03 | 2.28E−04 | −1.31E−05 |
| 13 | −3.38E+00 | −3.64E−03 | 3.21E−03 | −6.07E−04 | 1.13E−05 | −1.73E−06 | −7.39E−07 |
| 14 | −2.95E−01 | −3.62E−02 | −3.80E−02 | 3.64E−02 | −2.33E−02 | 6.23E−03 | −7.34E−04 |
| 15 | 6.49E−01 | −2.21E−01 | 3.41E−02 | 1.39E−02 | −1.74E−02 | 5.63E−03 | −1.28E−03 |
| 16 | 9.05E+00 | 2.01E−01 | −2.14E−01 | 1.65E−01 | −8.65E−02 | 2.67E−02 | −3.70E−03 |
| 17 | 1.17E+00 | 2.93E−01 | −1.63E−01 | −4.55E−02 | 4.94E−01 | −8.43E−01 | 3.77E−01 |
| 18 | −1.24E+00 | −2.22E−02 | −2.67E−03 | 3.45E−03 | −8.64E−04 | 8.84E−05 | −3.23E−06 |
| 19 | −3.83E+00 | −2.05E−02 | −2.06E−03 | 1.67E−03 | −3.03E−04 | 2.20E−05 | −5.57E−07 |

Group separation

| m | W | M | T |
|---|---|---|---|
| 2 | 0.6017373 | 0.5707610 | 1.6660788 |
| 5 | 0.2125802 | 2.7359933 | 3.5105097 |
| 11 | 5.1742651 | 2.2874673 | 0.2068006 |
| 17 | 1.6954327 | 2.0895333 | 2.3004180 |

FGi/|F|

| i = 1 | i = 2 | i = 3 |
|---|---|---|
| 1.3975 | 1.0297 | 0.8025 |

It is shown that the values of (focal length of each lens group(FGi))/|total focal length at the wide end(F)| of the present example fulfill the condition of Table 1. The maximum ray height corresponding to the V-edge is 3.4 mm, which realizes nearly the same value as the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 26.92 mm.

Example 2

Figure 8A:
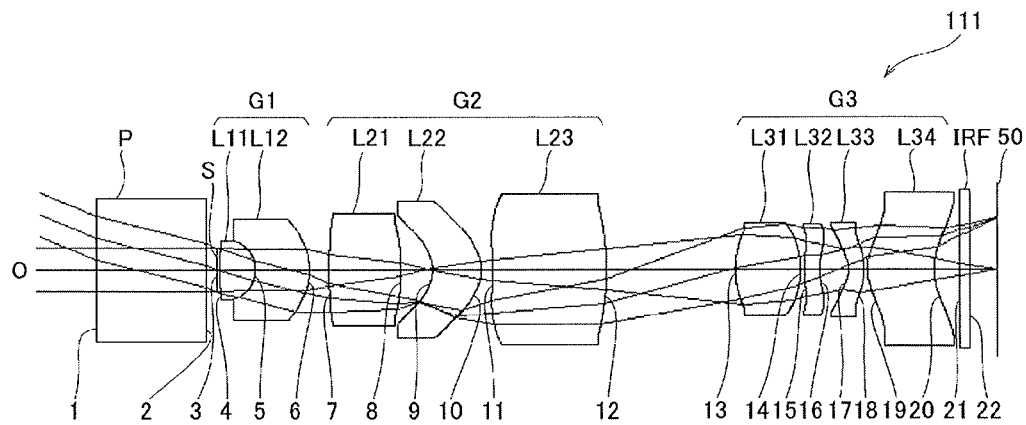
FIG. 8(a) is a section drawing at the wide end of the imaging optical system corresponding to the second example of the present invention.
Figure 8B:
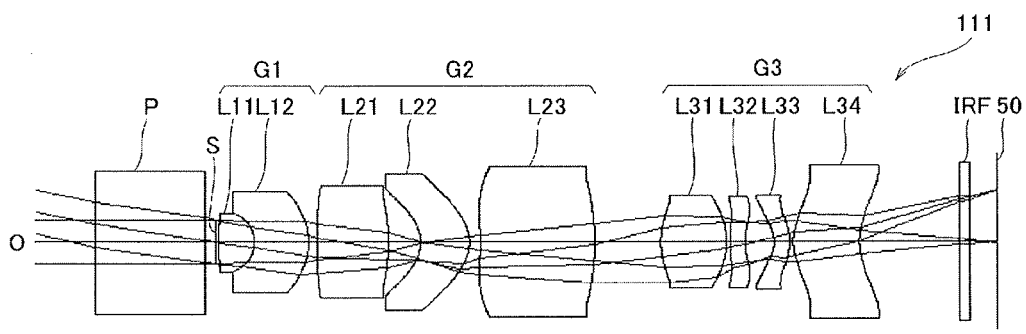
FIG. 8(b) is a section drawing at the medium magnification.
Figure 8C:
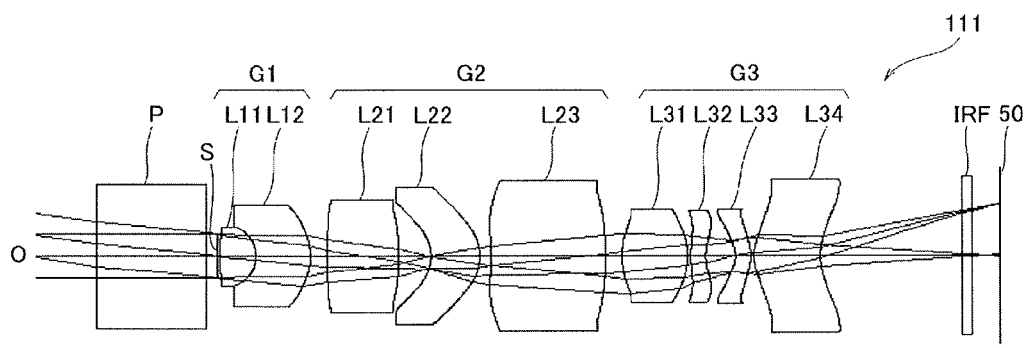
FIG. 8(c) is a section drawing at the telescopic end.

FIG. 8 shows the section drawing of the imaging optical system 111 of the present example. The imaging optical system 111 is an example of the imaging optical system 11 related to the second embodiment. As FIG. 8 shows, the imaging optical system 111 of the present example includes the first lens group G1 which has positive power after the prism P, and the second lens group G2 and the third lens group G3 which have positive power and are movable after the first lens group G1. The IR cut filter IRF and the image sensor 50 are located after the third lens group G3 in this order. The stop S is located at the front end (object side) of the first lens group G1 after the prism P.

The first lens group G1 comprises a cemented doublet of the first lens L11 which is convex at both surfaces and the second lens L12 which is meniscus with the front concave surface and the rear convex surface.

The second lens group G2 comprises the third lens L21 which is convex at both surfaces, the fourth lens L22 which is meniscus with the front concave surface and the rear convex surface, and the fifth lens L23 which is meniscus with the front concave surface and the rear convex surface.

The third lens group G3 includes the sixth lens L31 which is convex at both surfaces and the seventh lens L32 which is meniscus with the front convex surface and the rear concave surface. In addition, the third lens group G3 includes the eighth lens L33 which is meniscus with the front concave surface and the rear convex surface and the ninth lens L34 which is meniscus with the front convex surface and the rear concave surface after the seventh lens L32. All lenses of the first lens group G1, the second lens group G2, and the third lens group G3 are aspheres except for the cemented surface 5.

In the imaging optical system 111 of the present example, the zooming is done by moving the second lens group G2 and the third lens group G3, and the focusing is done by moving the first lens group G1.

The following Table 7 shows the specification of the imaging optical system 111 shown at FIG. 8.

TABLE 7

Total specification
2 ω = 70°
Image size = 4.552 mm × 3.414 mm (Y = 2.845 mm)
FNO = 2.8
Zooming ratio = 2.8
F = −4.063 mm
L = 29.51 mm
Maximum ray height corresponding to the V-edge = 3.6 mm Lens data

| m | r | d | nd | Vd |
|---|---|---|---|---|
| 1 | INFINITY | 3.6000000 | 1.51680 | 64.20 |
| 2 | INFINITY | 0.3305860 | | |
| 3 | INFINITY | 0.0999981 | | |
| 4 | 4.7924242 | 1.1967433 | 1.49700 | 81.61 |
| 5 | −1.0139650 | 1.7822256 | 1.56883 | 56.04 |
| 6 | −2.0859000 | 0.6455099 | | |
| 7 | 22.0437595 | 2.3410094 | 1.84666 | 23.78 |
| 8 | −8.9968220 | 1.0534341 | | |
| 9 | −0.9485915 | 1.5898679 | 1.69680 | 55.46 |
| 10 | −1.3216959 | 0.3701573 | | |
| 11 | −5.5587778 | 3.7374191 | 1.71300 | 53.94 |
| 12 | −8.3626145 | 4.2411460 | | |
| 13 | 2.7923560 | 2.1533553 | 1.49700 | 81.61 |
| 14 | −2.0953558 | 0.1026413 | | |
| 15 | 3.5431426 | 0.5000100 | 1.70154 | 41.15 |
| 16 | 1.7026495 | 0.9547510 | | |
| 17 | −0.8004187 | 0.5014478 | 1.84666 | 23.78 |
| 18 | −1.6741317 | 0.1064285 | | |
| 19 | 1.3261020 | 2.1648015 | 1.71300 | 53.94 |
| 20 | 1.8840294 | 0.8440608 | | |
| 21 | INFINITY | 0.3000000 | 1.51680 | 64.20 |
| 22 | INFINITY | 0.8992454 | | |

Aspheric coefficients

| m | K | A | B | C | D | E | F |
|---|---|---|---|---|---|---|---|
| 4 | 5.86E+00 | −1.59E−02 | 2.33E−02 | −4.54E−02 | 3.87E−02 | 4.66E−03 | −5.08E−03 |
| 6 | −4.37E+00 | −5.46E−02 | 2.46E−02 | −1.17E−02 | 3.39E−03 | −5.29E−04 | 3.46E−05 |
| 7 | 2.33E+00 | −2.75E−03 | 6.95E−03 | −3.62E−03 | 1.16E−03 | −1.87E−04 | 1.11E−05 |
| 8 | 4.92E+00 | −1.13E−02 | −3.32E−03 | 1.47E−03 | 1.55E−04 | 2.68E−05 | 9.25E−07 |
| 9 | −6.25E+00 | −1.60E−01 | 3.50E−02 | 6.39E−03 | −3.40E−03 | 4.85E−04 | −2.49E−05 |
| 10 | −7.42E−01 | 4.56E−02 | −1.43E−02 | 4.75E−03 | −5.13E−04 | 1.99E−05 | −6.77E−07 |
| 11 | −4.96E+00 | 5.29E−02 | −9.21E−03 | 5.97E−04 | 4.20E−05 | −7.27E−06 | 2.25E−07 |
| 12 | 3.22E−01 | −2.41E−03 | 1.38E−03 | −3.86E−04 | 5.96E−05 | −4.22E−06 | 1.48E−07 |
| 13 | 7.71E−01 | −9.56E−03 | −3.66E−03 | −4.60E−04 | −1.74E−04 | −3.24E−05 | −1.32E−06 |
| 14 | −5.61E+00 | −2.38E−02 | 2.09E−03 | 9.00E−06 | −5.99E−04 | 1.92E−04 | −1.78E−05 |
| 15 | 3.23E+00 | −1.02E−01 | −1.47E−03 | −3.23E−03 | 6.35E−03 | −2.22E−03 | 2.09E−04 |
| 16 | −3.21E−01 | −1.74E−01 | 2.72E−02 | −2.11E−02 | 1.21E−02 | −3.18E−03 | 3.19E−04 |
| 17 | −4.03E+00 | −2.20E−02 | 8.19E−02 | −8.15E−02 | 3.86E−02 | −9.28E−03 | 8.87E−04 |
| 18 | −5.26E+00 | −2.75E−02 | 4.79E−02 | −1.96E−02 | 7.19E−03 | −1.60E−03 | 1.16E−04 |
| 19 | −5.80E+00 | 2.64E−05 | −2.21E−03 | −7.48E−04 | 5.03E−04 | −8.98E−05 | 4.32E−06 |
| 20 | −4.56E+00 | 1.08E−03 | −1.99E−03 | 2.98E−04 | −4.02E−05 | 1.87E−06 | −1.25E−08 |

Group separation

| m | W | M | T |
|---|---|---|---|
| 6 | 0.6455099 | 0.2657847 | 0.5489867 |
| 12 | 4.2411460 | 2.1822547 | 0.5402629 |
| 20 | 0.8440608 | 3.2828722 | 4.6416292 |

FGi/|F|

| i = 1 | i = 2 | i = 3 |
|---|---|---|
| 0.8871 | 1.8302 | 0.8760 |

It is shown that the values of (focal length of each lens group(FGi))/|total focal length at the wide end(F)| of the present example fulfill the condition of Table 2. The maximum ray height corresponding to the V-edge is 3.6 mm, which realizes nearly the same value as the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 29.51 mm.

Example 3

Figure 9A:
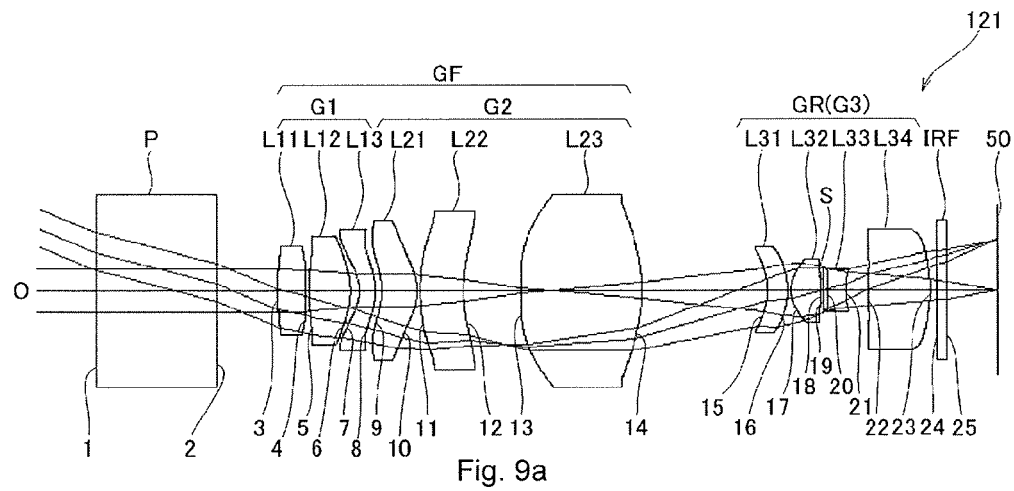
FIG. 9(a) is a section drawing at the wide end of the imaging optical system corresponding to the third example of the present invention.
Figure 9B:
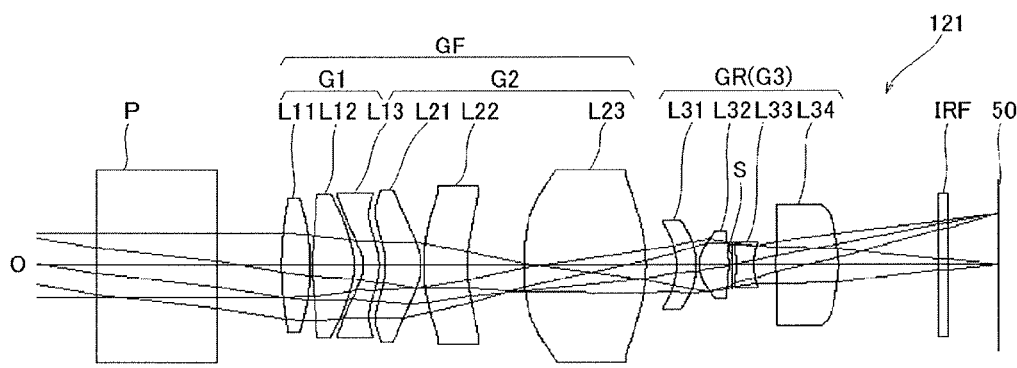
FIG. 9(b) is a section drawing at the medium magnification.
Figure 9C:
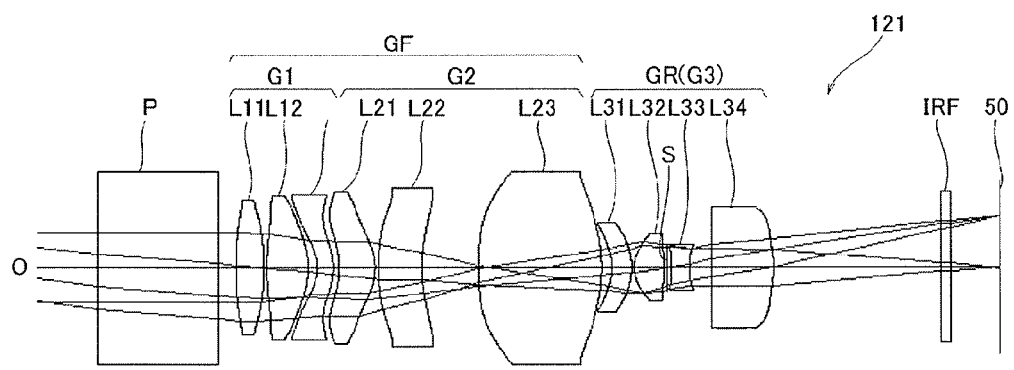
FIG. 9(c) is a section drawing at the telescopic end.

FIG. 9 shows the section drawing of the imaging optical system 121 of the present example. The imaging optical system 121 is an example of the imaging optical system 21 related to the third embodiment. As FIG. 9 shows, the imaging optical system 121 of the present example includes the front lens group GF (the first lens group G1 and the second lens group G2) which has positive power and is movable after the prism P and the rear lens group GR (the third lens group G3) which has positive power and is movable after the front lens group GF. The IR cut filter IRF and the image sensor 50 are located after the rear lens group GR in this order. The stop S is located between the eighth lens L32 and the ninth lens L33 of the rear lens group GR which are described below.

The front lens group GR includes the first lens L11 which is convex at both surfaces, the second lens L12 which is convex at both surfaces, and the third lens L21 which is meniscus with the front concave surface and the rear convex surface as the first lens group G1. The front lens group GR also includes the fourth lens L22 which is meniscus with the front concave surface and the rear convex surface, the fifth lens L23 which is meniscus with the front convex surface and the rear concave surface, and the sixth lens L24 which is convex at both surfaces as the second lens group G2. The distinction of the first lens group G1 and the second lens group G2 is not necessarily restricted to the above-stated way. It is enough that the total of the front lens group GF has the function to form the intermediate image and the function to refract the off-axis ray bundles toward along the optical axis.

The rear lens group GR comprises the seventh lens L31 which is meniscus with the front concave surface and the rear convex surface, the eighth lens L32 which is convex at both surfaces, the ninth lens L33 which is concave at both surfaces, and the tenth lens L34 which is convex at both surfaces, which are located after the eighth lens L32 connected by the stop P. All lenses of the front lens group GF and the rear lens group GR (the first lens group G1, the second lens group G2, and the third lens group G3) are aspheres.

In the imaging optical system 121 of the present example, the zooming is done by moving the front lens group GF and the rear lens group GR, and the focusing is done by moving the front lens group GF.

The following Table 8 shows the specification of the imaging optical system 121 shown at FIG. 9.

TABLE 8

Total specification
2 ω = 70°
Image size = 4.552 mm × 3.414 mm (Y = 2.845 mm)
FNO = 2.8
Zooming ratio = 3.5
F = −4.063 mm
L = 30.00 mm
Maximum ray height corresponding to the V-edge = 4.0 mm

| Lens data | | | | |
|---|---|---|---|---|
| m | r | d | nd | Vd |
| 1 | INFINITY | 4.0000000 | 1.51680 | 64.20 |
| 2 | INFINITY | 2.0673045 | | |
| 3 | 9.9477904 | 0.9212518 | 1.49700 | 81.61 |
| 4 | −36.1123533 | 0.1000025 | | |
| 5 | 6.3334788 | 1.3906934 | 1.49700 | 81.61 |
| 6 | −2.4044545 | 0.3334809 | | |
| 7 | −1.1217234 | 0.5008360 | 1.72342 | 37.99 |
| 8 | −2.1548331 | 0.2165537 | | |
| 9 | −2.5629226 | 1.1731649 | 1.49700 | 81.61 |
| 10 | −1.6527482 | 0.1045501 | | |
| 11 | 6.8469867 | 1.4355780 | 1.84666 | 23.78 |
| 12 | 4.0597291 | 1.9011653 | | |
| 13 | 18.7278772 | 4.0768226 | 1.53996 | 59.71 |
| 14 | −5.5495381 | 4.1993310 | | |
| 15 | −1.4154655 | 0.6505659 | 1.59201 | 67.02 |
| 16 | −2.1666633 | 0.1052542 | | |
| 17 | 1.0036680 | 0.9831631 | 1.49700 | 81.61 |
| 18 | −7.4708328 | 0.1000043 | | |
| 19 | INFINITY | 0.1365020 | | |
| 20 | −3.3754276 | 0.6039223 | 1.72047 | 34.72 |
| 21 | 3.5940007 | 0.7270050 | | |
| 22 | 6.8135537 | 0.0799373 | 1.50137 | 56.41 |
| 23 | −2.1974635 | 0.2257846 | | |
| 24 | INFINITY | 0.3000000 | 1.51680 | 64.20 |
| 25 | INFINITY | 0.6671757 | | |

| Aspheric coefficients | | | | | | | |
|---|---|---|---|---|---|---|---|
| m | K | A | B | C | D | E | F |
| 3 | 2.88E+00 | −3.73E−03 | 3.58E−03 | −2.02E−03 | 5.03E−04 | −5.61E−05 | 2.18E−06 |
| 4 | −2.94E+00 | −4.46E−02 | 2.20E−02 | −7.29E−03 | 1.41E−03 | −1.33E−04 | 4.72E−06 |
| 5 | −4.16E+00 | −2.14E−02 | 8.58E−03 | −3.11E−03 | 5.92E−04 | −4.89E−05 | 1.44E−06 |
| 6 | −7.33E−01 | 4.06E−02 | −7.89E−03 | 6.99E−04 | −2.42E−06 | −2.47E−06 | 5.44E−08 |

TABLE 8-continued

| | | | | | | |
|---|---|---|---|---|---|---|
| 7 | −9.74E−01 | 1.33E−01 | −2.66E−02 | 3.31E−03 | −2.20E−04 | 3.53E−06 | 4.22E−08 |
| 8 | −2.02E+00 | 1.30E−02 | 1.56E−02 | −4.70E−03 | 6.18E−04 | −4.35E−05 | 1.32E−06 |
| 9 | −9.25E+00 | −4.18E−02 | 2.85E−02 | −6.27E−03 | 7.39E−04 | −4.79E−05 | 1.29E−06 |
| 10 | −1.17E+00 | 6.22E−02 | −1.26E−02 | 1.43E−03 | −9.28E−05 | 3.98E−06 | −1.48E−07 |
| 11 | −8.54E+00 | 5.17E−03 | 7.39E−04 | −1.68E−04 | −1.35E−05 | 1.90E−06 | −7.83E−08 |
| 12 | −5.66E+00 | −2.04E−02 | 7.28E−03 | −1.31E−03 | 1.13E−04 | −5.02E−06 | 1.06E−07 |
| 13 | 2.61E+01 | 1.87E−02 | −1.81E−03 | 5.52E−05 | 3.14E−06 | −2.74E−07 | 3.89E−09 |
| 14 | 1.37E+00 | 1.63E−03 | 1.91E−04 | 4.43E−05 | −8.15E−06 | 6.27E−07 | −1.30E−08 |
| 15 | −7.11E+00 | 6.91E−03 | −2.27E−02 | 1.42E−02 | −8.10E−03 | 2.13E−03 | −1.96E−04 |
| 16 | 3.71E−01 | 3.52E−02 | −7.12E−03 | 4.70E−04 | −3.17E−04 | 3.29E−04 | −3.14E−05 |
| 17 | −4.39E−01 | −1.94E−01 | 1.08E−01 | −1.33E−01 | 7.51E−02 | −3.19E−02 | 5.14E−03 |
| 18 | 1.14E+00 | −4.34E−02 | 8.27E−02 | −7.08E−02 | 4.05E−02 | −1.32E−02 | 3.59E−03 |
| 20 | −6.13E−01 | 1.59E−01 | −2.11E−02 | −3.58E−03 | −1.18E−02 | 6.10E−02 | −3.04E−02 |
| 21 | −8.20E+00 | 1.99E−01 | 1.01E−01 | −3.48E−01 | 5.66E−01 | −3.64E−01 | 1.06E−01 |
| 22 | 1.57E+00 | −3.54E−02 | −2.31E−02 | 3.26E−02 | −2.89E−02 | 9.94E−03 | −1.25E−03 |
| 23 | −2.51E+01 | 4.13E−02 | −2.63E−02 | 5.87E−03 | −8.81E−04 | 6.04E−05 | −2.53E−06 |

Group separation

| m | W | M | T |
|---|---|---|---|
| 2 | 2.0673045 | 2.1761626 | 0.6046647 |
| 14 | 4.1993310 | 1.0074333 | 0.3470603 |
| 23 | 0.2257846 | 3.3088577 | 5.5410009 |

$FG_i/|F|$

| i = F | i = R |
|---|---|
| 1.5924 | 0.8334 |

It is shown that the values of (focal length of each lens group($FG_i$))/|total focal length at the wide end($F$)| of the present example fulfill the condition of Table 3. The maximum ray height corresponding to the V-edge is 4.0 mm, which realizes the near value to the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 30.00 mm.

Example 4

Figure 10A:
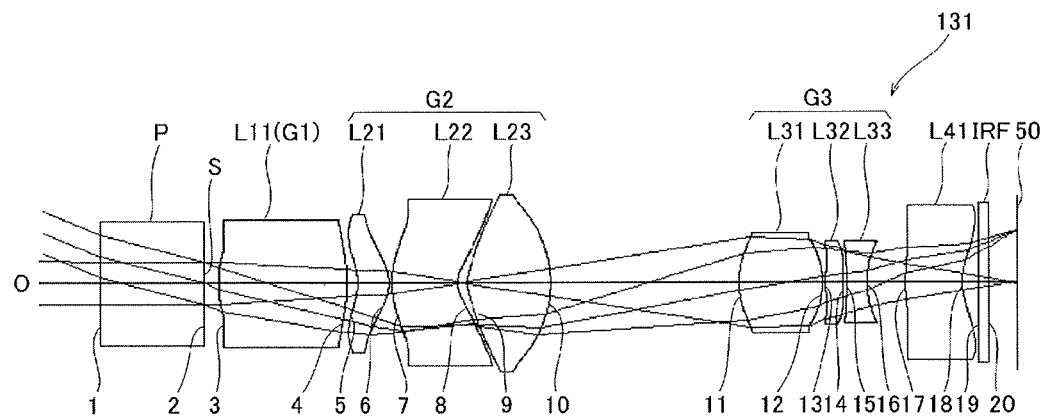
FIG. 10(a) is a section drawing at the wide end of the imaging optical system corresponding to the fourth example of the present invention.
Figure 10B:
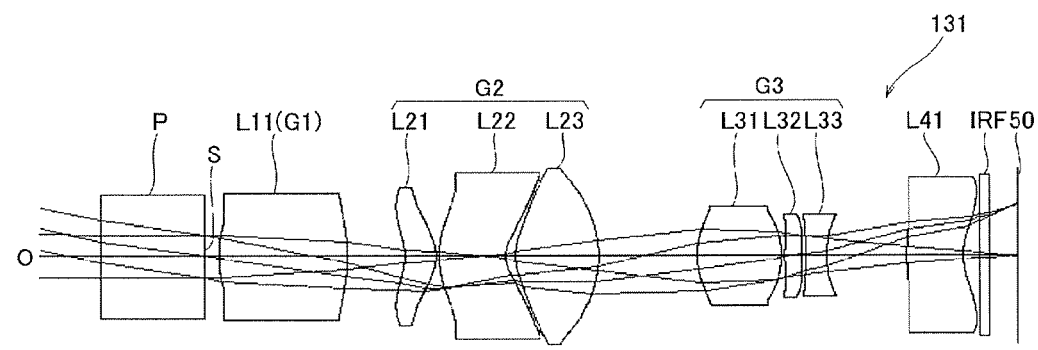
FIG. 10(b) is a section drawing at the medium magnification.
Figure 10C:
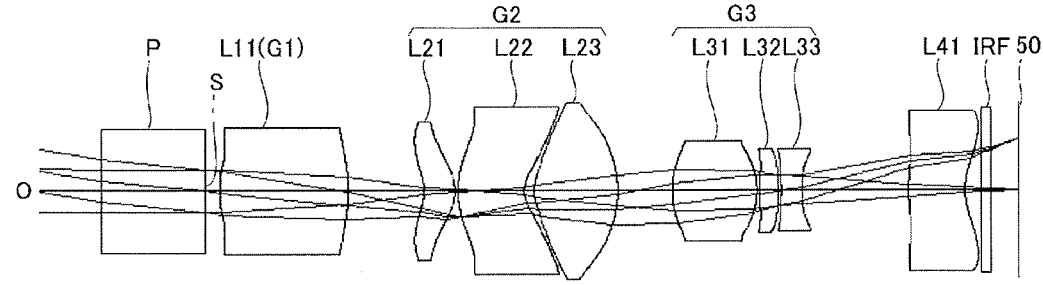
FIG. 10(c) is a section drawing at the telescopic end.

FIG. 10 shows the section drawing of the imaging optical system 131 of the present example. The imaging optical system 131 is an example of the imaging optical system 11 related to the second embodiment. As FIG. 10 shows, the imaging optical system 131 of the present example includes the first lens L11 (the first lens group G1) which has positive power and is movable after the prism P, and the second lens group G2 and the third lens group G3 which have positive power and are movable after the first lens L11. The fixed lens L41 is located after the third lens group G3, and the IR cut filter IRF and the image sensor 50 are located after the fixed lens L41 in this order. The stop S is formed at the rear surface of the prism P.

The first lens L11 (the first lens group G1) is convex at both surfaces.

The second lens group G2 comprises the second lens L21 which is meniscus with the front concave surface and the rear convex surface, the third lens L22 which is meniscus with the front convex surface and the rear concave surface, and the fourth lens L23 which is concave at both surfaces.

The third lens group G3 comprises the fifth lens L31 which is convex at both surfaces, the sixth lens L32 which is meniscus with the front convex surface and the rear concave surface, and the seventh lens L33 which is concave at both surfaces.

The fixed lens L41 is meniscus with the front convex surface and the rear concave surface. All lenses of the first lens group G1, the second lens group G2, the third lens group G3, and the fixed lens L41 are asphere.

In the imaging optical system 131 of the present example, the zooming is done by moving the second lens group G2 and the third lens group G3, and the focusing is done by moving the first lens group G1.

The following Table 9 shows the specification of the imaging optical system 131 shown at FIG. 10.

TABLE 9

Total specification

2 ω = 70°

Image size = 4.552 mm × 3.414 mm (Y = 2.845 mm)

FNO = 2.8

Zooming ratio = 3.5

F = −4.063 mm

L = 30.00 mm

Maximum ray height corresponding to the V-edge = 3.4 mm

TABLE 9-continued

Lens data

| m | r | d | nd | Vd |
|---|---|---|---|---|
| 1 | INFINITY | 3.4000000 | 1.51680 | 64.20 |
| 2 | INFINITY | 0.4858325 | | |
| 3 | 3.8517890 | 4.2194283 | 1.49700 | 81.61 |
| 4 | −5.3748003 | 0.3396133 | | |
| 5 | −1.7752715 | 1.0300928 | 1.53116 | 56.15 |
| 6 | −1.2735683 | 0.1000007 | | |
| 7 | 3.0621640 | 2.1620967 | 1.82114 | 24.06 |
| 8 | 0.7764885 | 0.3208142 | | |
| 9 | 1.2536618 | 2.7237377 | 1.53116 | 56.15 |
| 10 | −3.5719440 | 6.1767027 | | |
| 11 | 2.6291686 | 2.7485971 | 1.49700 | 81.61 |
| 12 | −2.2742430 | 0.1032998 | | |
| 13 | 5.4230279 | 0.5686936 | 1.53116 | 56.15 |
| 14 | 11.4652752 | 0.1363856 | | |
| 15 | −4.9123687 | 0.6824105 | 1.82114 | 24.06 |
| 16 | 7.3044061 | 1.2233549 | | |
| 17 | 5.2564762 | 1.8371709 | 1.53116 | 56.15 |
| 18 | 2.0971204 | 0.5402834 | | |
| 19 | INFINITY | 0.3000000 | 1.51680 | 64.20 |
| 20 | INFINITY | 0.8989604 | | |

Aspheric coefficients

| m | K | A | B | C | D | E | F |
|---|---|---|---|---|---|---|---|
| 3 | −1.26E+01 | 2.63E−02 | −8.65E−03 | 1.86E−03 | 7.74E−05 | 1.69E−04 | −9.91E−05 |
| 4 | −2.29E+01 | −1.33E−02 | 5.81E−03 | −1.15E−03 | 1.08E−04 | −6.02E−07 | −1.36E−07 |
| 5 | −2.30E+00 | 6.81E−02 | −9.85E−03 | −1.92E−04 | 3.40E−04 | −4.32E−05 | 1.45E−06 |
| 6 | −1.79E+00 | 3.93E−02 | 2.29E−03 | −3.85E−03 | 9.13E−04 | −8.65E−05 | 2.84E−06 |
| 7 | −6.55E+00 | 1.82E−02 | −5.91E−03 | 4.38E−04 | 2.42E−05 | −4.58E−06 | −4.55E−09 |
| 8 | −3.42E+00 | −1.42E−02 | 7.06E−04 | 3.72E−04 | −6.95E−05 | 4.34E−06 | −1.09E−07 |
| 9 | −6.09E+00 | −1.36E−02 | 4.59E−03 | −6.04E−04 | 4.14E−05 | −1.56E−06 | 2.81E−08 |
| 10 | −5.94E+00 | −1.47E−02 | 1.98E−03 | −2.40E−04 | 1.38E−05 | 8.40E−09 | −2.41E−09 |
| 11 | 8.98E−01 | −1.33E−02 | −7.87E−03 | 4.25E−03 | −2.74E−03 | 5.85E−04 | −4.94E−05 |
| 12 | −5.66E+00 | −1.81E−02 | −1.75E−02 | 1.87E−02 | −9.28E−03 | 2.28E−03 | −2.01E−04 |
| 13 | 3.75E+00 | −4.30E−02 | −6.91E−02 | 6.02E−02 | −2.42E−02 | 5.81E−03 | −5.29E−04 |
| 14 | 4.72E+01 | −8.82E−02 | 7.33E−03 | −2.39E−02 | 1.92E−02 | −5.41E−03 | 5.78E−04 |
| 15 | 1.11E+01 | 1.21E−01 | −3.25E−02 | −2.89E−02 | 1.91E−02 | −4.07E−03 | 1.37E−04 |
| 16 | −6.57E+00 | 1.18E−01 | 2.52E−03 | −4.81E−02 | 2.27E−02 | −5.16E−03 | 5.26E−04 |
| 17 | −5.85E+00 | −2.00E−02 | −1.94E−03 | 1.51E−03 | −1.35E−04 | −7.00E−05 | 4.41E−06 |
| 18 | −3.44E+00 | −2.15E−02 | 1.59E−03 | 2.79E−04 | −9.96E−05 | 7.62E−06 | −2.15E−07 |

Group separation

| m | W | M | T |
|---|---|---|---|
| 4 | 0.3396133 | 1.8739271 | 2.4574254 |
| 10 | 6.1767027 | 3.2529403 | 1.7912946 |
| 16 | 1.2233549 | 2.6129363 | 3.4912232 |

FGi/|F|

| i = 1 | i = 2 | i = 3 |
|---|---|---|
| 1.3067 | 1.1499 | 0.9284 |

It is shown that the values of (focal length of each lens group(FGi))/|total focal length at the wide end(F)| of the present example fulfill the condition of Table 2. The maximum ray height corresponding to the V-edge is 3.4 mm, which realizes nearly the same value as the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 30.00 mm. In addition, the material of L22, L31, L33, and L41 of the present example is plastic and the reduction of the cost can be achieved compared to the molded glasses.

Example 5

Figure 11A:
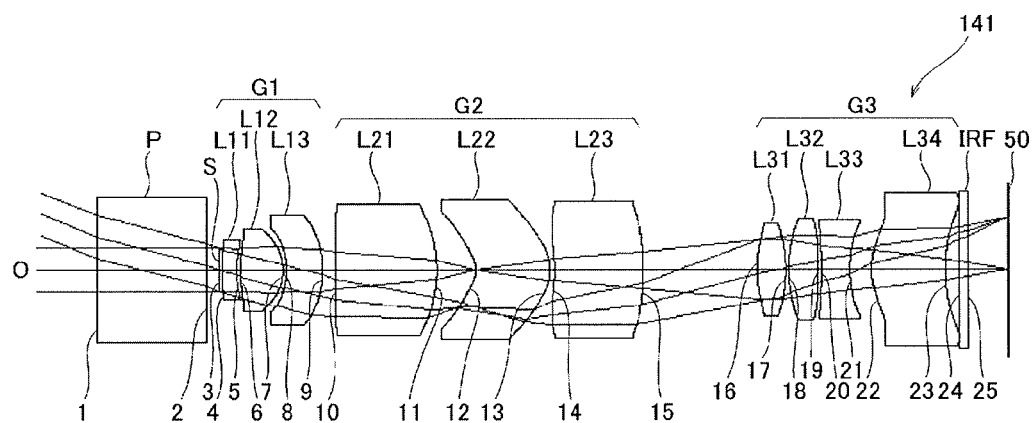
FIG. 11(a) is a section drawing at the wide end of the imaging optical system corresponding to the fifth example of the present invention.
Figure 11B:
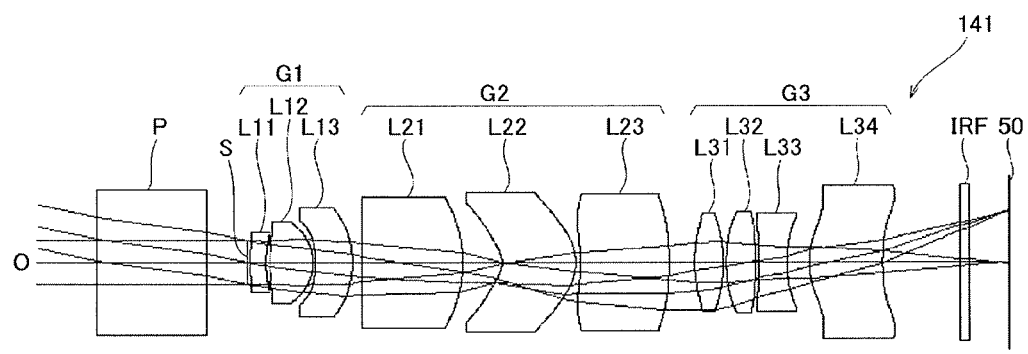
FIG. 11(b) is a section drawing at the medium magnification.
Figure 11C:
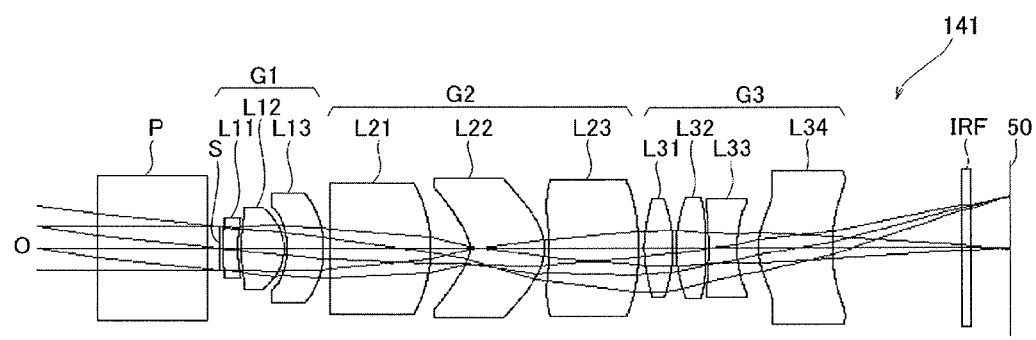
FIG. 11(c) is a section drawing at the telescopic end.

FIG. 11 shows the section drawing of the imaging optical system 141 of the present example. The imaging optical system 141 is an example of the imaging optical system 1 related to the first embodiment. As FIG. 11 shows, the imaging optical system 141 of the present example includes the first lens group G1, the second lens group G2, and the third lens group G3 which have positive power and are movable in this order after the prism P. The IR cut filter IRF and the image sensor 50 are located after the third lens group G3 in this order. The stop S is located at the front end (object side) of the first lens group G1.

The first lens group G1 comprises the stop S, the first lens L11 which is meniscus with the front convex surface and the rear concave surface, the second lens L12 which is convex at both surfaces, and the third lens L13 which is meniscus with the front concave surface and the rear convex and surface.

The second lens group G2 comprises the fourth lens L21 which is meniscus with the front concave surface and the rear convex surface, the fifth lens L22 which is meniscus with the front concave surface and the rear convex surface, and the sixth lens L23 which is meniscus with the front concave surface and the rear convex surface.

The third lens group G3 comprises the seventh lens L31 which is convex at both surfaces and the eighth lens L32 which is meniscus with the front convex surface and the rear concave surface, the ninth lens L33 which is concave at both surfaces, and the tenth lens L34 which is meniscus with the front convex surface and the rear concave surface. All lenses of the first lens group G1, the second lens group G2, and the third lens group G3 are aspheres.

In the imaging optical system 141 of the present example, the zooming is done by moving the first lens group G1, the second lens group G2, and the third lens group G3, and the focusing is done by moving the first lens group G1.

The following Table 10 shows the specification of the imaging optical system 141 shown at FIG. 11.

TABLE 10

Total specification
$2\omega = 70°$
Image size = 4.552 mm × 3.414 mm (Y = 2.845 mm)
FNO = 2.8
Zooming ratio = 2.8
F = −4.063 mm
L = 29.83 mm
Maximum ray height corresponding to the V-edge = 3.6 mm

| | Lens data | | | |
|---|---|---|---|---|
| m | r | d | nd | Vd |
| 1 | INFINITY | 3.6000000 | 1.51680 | 64.20 |
| 2 | INFINITY | 0.3798570 | | |
| 3 | INFINITY | 0.0999985 | | |
| 4 | 4.8388758 | 0.5000007 | 1.82080 | 42.71 |
| 5 | 2.6646485 | 0.1362892 | | |
| 6 | 5.4646156 | 1.3860729 | 1.49700 | 81.61 |
| 7 | −1.5641059 | 0.1017730 | | |
| 8 | −2.7956111 | 1.1889590 | 1.63219 | 23.42 |
| 9 | −3.4182768 | 0.4375511 | | |
| 10 | −123.2294313 | 3.3035354 | 1.85135 | 40.10 |
| 11 | −4.3611938 | 1.2930171 | | |
| 12 | −0.6692682 | 2.4326163 | 1.53116 | 56.15 |
| 13 | −1.3616053 | 0.1498654 | | |
| 14 | −4.4292473 | 2.9041824 | 1.58547 | 29.90 |
| 15 | −10.7439359 | 3.7525477 | | |
| 16 | 3.9147966 | 0.9428957 | 1.49700 | 81.61 |
| 17 | −4.2056110 | 0.1016232 | | |
| 18 | 4.6754001 | 0.9514837 | 1.49700 | 81.61 |
| 19 | 56.7714551 | 0.1284992 | | |
| 20 | −10.1867797 | 0.9198267 | 1.80610 | 33.27 |
| 21 | 4.1504703 | 0.7086235 | | |
| 22 | 2.1446065 | 2.4254184 | 1.53116 | 56.15 |
| 23 | 10.1449975 | 0.4012059 | | |
| 24 | INFINITY | 0.3000000 | 1.51680 | 64.20 |
| 25 | INFINITY | 1.2822941 | | |

| | Aspheric coefficients | | | | | | |
|---|---|---|---|---|---|---|---|
| m | K | A | B | C | D | E | F |
| 4 | −4.57E+00 | −6.62E−02 | −1.06E−01 | 4.19E−01 | −8.37E−01 | 8.01E−01 | −2.81E−01 |
| 5 | 8.15E−01 | −1.19E−01 | 6.30E−02 | −1.22E−01 | 1.83E−01 | −1.11E−01 | 2.11E−02 |
| 6 | 1.37E+00 | −3.88E−02 | 2.03E−02 | −4.38E−02 | 8.10E−02 | −4.68E−02 | 7.51E−03 |
| 7 | −3.11E−01 | −3.09E−03 | 1.37E−02 | −2.40E−02 | 1.44E−02 | −3.93E−03 | 3.36E−04 |
| 8 | −2.02E+00 | −3.02E−02 | 5.97E−03 | −2.21E−02 | 1.23E−02 | −3.00E−03 | 2.26E−04 |
| 9 | −2.99E−01 | −8.48E−03 | 2.65E−03 | −3.65E−03 | 1.30E−03 | −1.90E−04 | 1.06E−05 |
| 10 | −2.41E−01 | 2.63E−03 | 9.87E−05 | −1.12E−04 | 8.78E−06 | 1.99E−06 | −8.08E−08 |
| 11 | 6.23E−02 | 1.23E−02 | −9.43E−03 | 2.73E−03 | −4.10E−04 | 3.84E−05 | −1.64E−06 |
| 12 | −3.21E+00 | 1.01E−02 | −1.28E−02 | 6.24E−03 | −2.07E−03 | 3.20E−04 | −1.44E−05 |
| 13 | −1.22E+00 | 3.61E−02 | −9.56E−03 | 1.39E−03 | −9.22E−05 | 2.15E−06 | −4.19E−08 |
| 14 | 1.98E+00 | 4.38E−02 | −3.83E−03 | 5.66E−05 | 1.05E−04 | −1.57E−05 | 5.39E−07 |
| 15 | 2.31E+00 | −1.03E−02 | 3.28E−03 | −9.31E−04 | 1.39E−04 | −1.21E−05 | 4.68E−07 |
| 16 | −2.43E+00 | −2.88E−03 | −1.68E−03 | 7.24E−04 | −9.04E−04 | 2.31E−04 | −1.79E−05 |
| 17 | −1.26E+01 | −4.37E−03 | 5.44E−05 | −1.38E−03 | 4.36E−04 | −5.82E−05 | 3.08E−06 |
| 18 | −1.92E+00 | 9.39E−03 | −4.53E−03 | 7.01E−04 | 4.18E−04 | −9.42E−05 | 5.62E−06 |
| 19 | 2.43E−01 | −3.32E−02 | 5.30E−03 | 2.29E−04 | −7.78E−04 | 2.54E−04 | −1.14E−05 |
| 20 | 1.07E+01 | 8.61E−03 | 3.06E−03 | −1.32E−03 | −5.07E−04 | 2.80E−04 | −1.77E−05 |
| 21 | 5.17E+00 | −1.75E−02 | 1.64E−02 | −7.22E−03 | 1.75E−04 | 2.99E−04 | −2.86E−05 |
| 22 | −2.14E+00 | −1.95E−02 | 5.32E−03 | −1.79E−03 | 2.32E−04 | −6.22E−05 | 4.50E−06 |
| 23 | 3.57E+00 | 3.05E−02 | −6.30E−03 | 5.81E−04 | −1.09E−04 | 1.04E−05 | −2.94E−07 |

TABLE 10-continued

| | Group separation | | |
|---|---|---|---|
| m | W | M | T |
| 2 | 0.3798570 | 1.3377592 | 0.3810934 |
| 9 | 0.4375511 | 0.3095757 | 0.2003101 |
| 15 | 3.7525477 | 0.8314666 | 0.1997644 |
| 23 | 0.4012059 | 2.4921402 | 4.1903461 |

| FGi/|F| | | |
|---|---|---|
| i = 1 | i = 2 | i = 3 |
| 1.0480 | 6.8326 | 0.9020 |

It is shown that the values of (focal length of each lens group(FGi))/|total focal length at the wide end(F)| of the present example fulfill the condition of Table 1. The maximum ray height corresponding to the V-edge is 3.6 mm, which realizes nearly the same value as the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 29.83 mm. In addition, the material of L13, L22, L23, and L34 of the present example is plastic and the reduction of the cost can be achieved compared to the molded glasses.

Example 6

Figure 12A:
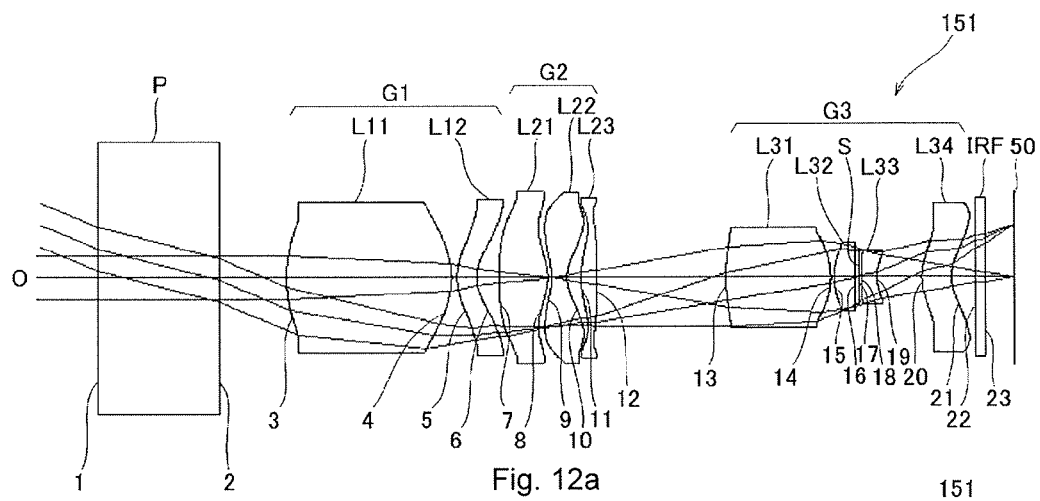
FIG. 12(a) is a section drawing at the wide end of the imaging optical system corresponding to the sixth example of the present invention.
Figure 12B:
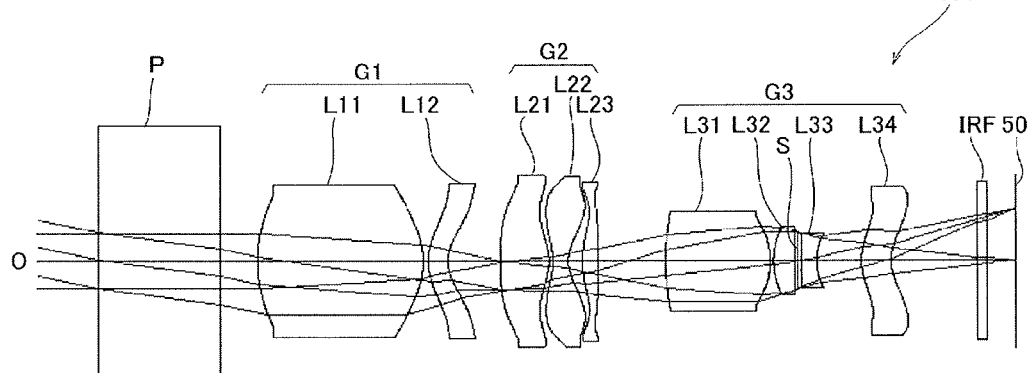
FIG. 12(b) is a section drawing at the medium magnification.
Figure 12C:
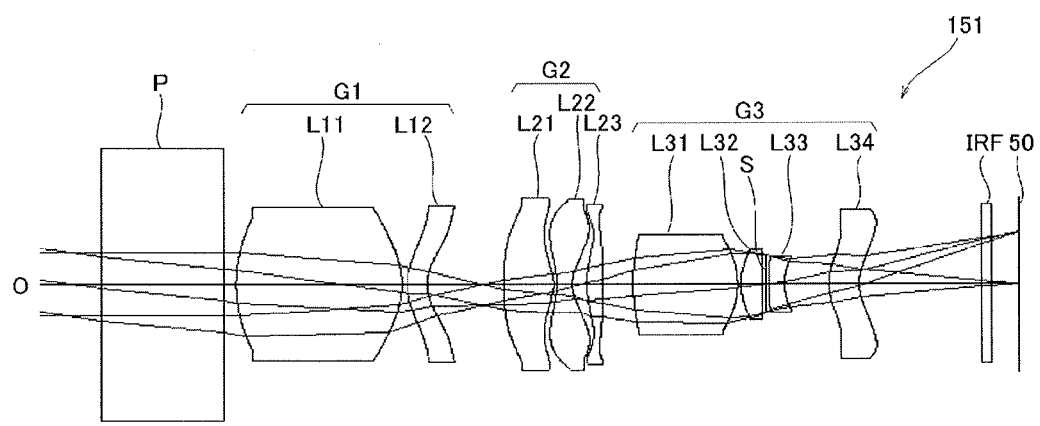
FIG. 12(c) is a section drawing at the telescopic end.

FIG. 12 shows the section drawing of the imaging optical system 151 of the present example. The imaging optical system 151 is an example of the imaging optical system 31 related to the fourth embodiment. As FIG. 12 shows, the imaging optical system 151 of the present example includes the first lens group G1 which has positive power and is movable after the prism P, the second lens group G2 which has positive power and is a fixed lens group after the first lens group G1, and the third lens group G3 which has positive power and is movable after the second lens group G2. The IR cut filter IRF and the image sensor 50 are located after the third lens group G3 in this order. The stop S is located between the seventh lens L32 and the eighth lens L33 of the third lens group G3 which are described below.

The first lens group G1 comprises the first lens L11 which is convex at both surfaces and the second lens L12 which is meniscus with the front convex surface and the rear concave surface.

The second lens group G2 comprises the third lens L21 which is convex at both surfaces, the fourth lens L22 which is concave at both surfaces, and the fifth lens L23 which is convex at both surfaces.

The third lens group G3 includes the sixth lens L31 which is convex at both surfaces and the seventh lens L32 which is meniscus with the front convex surface and the rear concave surface. In addition, The third lens group G3 includes the eighth lens L33 which is meniscus with the front convex surface and the rear concave surface and the ninth lens L34 which is meniscus with the front convex surface and the rear concave surface after the seventh lens L32 connected by the stop P. All lenses of the first lens group G1, the second lens group G2, and the third lens group G3 are aspheres.

In the imaging optical system 151 of the present example, the second lens group G2 is fixed, the zooming is done by moving the first lens group G1 and the third lens group G3, and the focusing is done by moving the first lens group G1.

The following Table 11 shows the specification of the imaging optical system 151 shown at FIG. 12.

TABLE 11

Total specification
2 ω = 70°
Image size = 4.552 mm × 3.414 mm (Y = 2.845 mm)
FNO = 2.8
Zooming ratio = 2.8
F = −4.063 mm
L = 30.00 mm
Maximum ray height corresponding to the V-edge = 4.0 mm

| Lens data | | | | |
|---|---|---|---|---|
| m | r | d | nd | Vd |
| 1 | INFINITY | 4.0000000 | 1.51680 | 64.20 |
| 2 | INFINITY | 2.2079141 | | |
| 3 | 4.5739477 | 5.4175497 | 1.49700 | 81.61 |
| 4 | −2.2511763 | 0.1727827 | | |
| 5 | 2.0253995 | 0.6387439 | 1.84666 | 23.78 |
| 6 | 1.2694701 | 0.7177441 | | |
| 7 | 6.8499487 | 1.6255997 | 1.77250 | 49.62 |
| 8 | −1.3308872 | 0.1137200 | | |
| 9 | −1.6696705 | 0.5000027 | 1.60342 | 38.01 |
| 10 | 1.0810322 | 0.4868751 | | |
| 11 | 3.8286203 | 0.5000024 | 1.78590 | 43.93 |
| 12 | −15.7065932 | 4.2702072 | | |

TABLE 11-continued

| | | | | |
|---|---|---|---|---|
| 13 | 5.2991206 | 3.4398664 | 1.49700 | 81.61 |
| 14 | −2.4270075 | 0.1000662 | | |
| 15 | 2.0194998 | 0.6982299 | 1.49700 | 81.61 |
| 16 | 12.7949216 | 0.1061898 | | |
| 17 | INFINITY | 0.0999981 | | |
| 18 | 6.0595334 | 0.4999981 | 1.76182 | 26.61 |
| 19 | 1.4481098 | 1.4629164 | | |
| 20 | 1.7256007 | 0.9734905 | 1.61881 | 63.85 |
| 21 | 1.4800396 | 0.7678123 | | |
| 22 | INFINITY | 0.3000000 | 1.51680 | 64.20 |
| 23 | INFINITY | 0.9000385 | | |

Aspheric coefficients

| m | K | A | B | C | D | E | F |
|---|---|---|---|---|---|---|---|
| 3 | 1.11E+00 | −2.55E−03 | −1.77E−04 | −4.26E−06 | −3.23E−06 | 3.81E−07 | −3.25E−08 |
| 4 | −4.81E+00 | −4.61E−03 | −7.13E−04 | 4.61E−04 | −8.23E−05 | 6.44E−06 | −1.85E−07 |
| 5 | −5.52E−01 | −2.55E−02 | −5.41E−03 | 1.15E−03 | −6.53E−05 | −2.53E−06 | 1.21E−07 |
| 6 | −1.48E+00 | −4.68E−02 | 2.72E−03 | 7.71E−04 | −1.60E−04 | 1.13E−05 | −2.92E−07 |
| 7 | −3.91E+00 | −9.28E−03 | 6.02E−03 | −7.51E−04 | 1.38E−05 | 1.07E−06 | −2.23E−08 |
| 8 | −7.84E+00 | 2.04E−02 | 5.45E−04 | −8.04E−05 | −3.14E−06 | 2.48E−06 | −5.62E−08 |
| 9 | −1.68E+01 | 1.71E−02 | −2.75E−03 | 5.57E−04 | 3.86E−06 | −4.87E−06 | 1.14E−07 |
| 10 | −3.67E+00 | −1.11E−02 | −3.27E−03 | 1.67E−04 | −1.33E−05 | 6.32E−06 | −1.75E−07 |
| 11 | −7.45E+00 | 1.87E−02 | −1.57E−02 | 2.18E−03 | −1.08E−04 | 4.68E−06 | −1.08E−07 |
| 12 | −5.41E+00 | 2.15E−02 | −1.26E−02 | 2.44E−03 | −1.30E−04 | −1.52E−06 | 5.60E−08 |
| 13 | 5.07E+00 | −1.19E−02 | −3.51E−03 | 1.09E−03 | −3.97E−04 | 9.00E−05 | −7.23E−06 |
| 14 | −7.19E+00 | −6.15E−02 | 2.48E−02 | −5.97E−03 | 6.83E−04 | −3.23E−06 | 1.95E−06 |
| 15 | 7.77E−01 | −2.48E−02 | −5.56E−02 | 6.95E−02 | −7.44E−02 | 3.43E−02 | −6.31E−03 |
| 16 | 3.79E+00 | −1.05E−01 | 2.06E−01 | −3.07E−01 | 2.26E−01 | −8.64E−02 | 1.34E−02 |
| 18 | 6.98E+00 | −1.99E−01 | 4.26E−01 | −4.80E−01 | 2.98E−01 | −9.00E−02 | 9.59E−03 |
| 19 | 6.53E−01 | −2.95E−01 | 5.13E−01 | −7.46E−01 | 6.39E−01 | −3.05E−01 | 4.15E−02 |
| 20 | −1.29E+00 | −6.30E−02 | 4.84E−03 | 2.18E−03 | −1.07E−03 | 1.65E−04 | −9.77E−06 |
| 21 | −1.04E+00 | −8.39E−02 | 1.48E−02 | −1.21E−03 | −1.14E−04 | 1.76E−05 | −5.16E−07 |

Group separation

| m | W | M | T |
|---|---|---|---|
| 2 | 2.2079141 | 1.2393953 | 0.4227260 |
| 6 | 0.7177441 | 1.6862628 | 2.5029321 |
| 12 | 4.2702072 | 2.2317523 | 1.0310578 |
| 21 | 0.7678123 | 2.8062671 | 4.0069616 |

FGi/|F|

| i = 1 | i = 2 | i = 3 |
|---|---|---|
| 1.1555 | 1.9806 | 0.6513 |

It is shown that the values of (focal length of each lens group (FGi))/|total focal length at the wide end(F)| of the present example fulfill the condition of Table 4. The maximum ray height corresponding to the V-edge is 4.0 mm, which realizes the near value to the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 30.00 mm.

Example 7

Figure 13A:
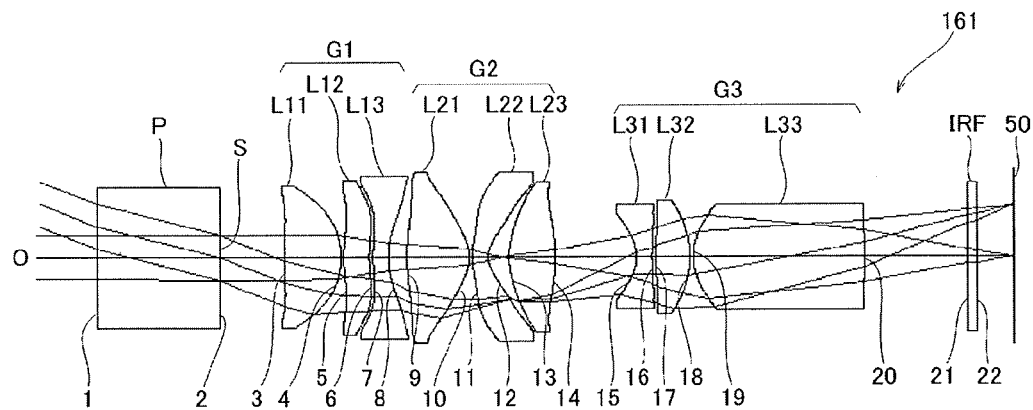
FIG. 13(a) is a section drawing at the wide end of the imaging optical system corresponding to the seventh example of the present invention.
Figure 13B:
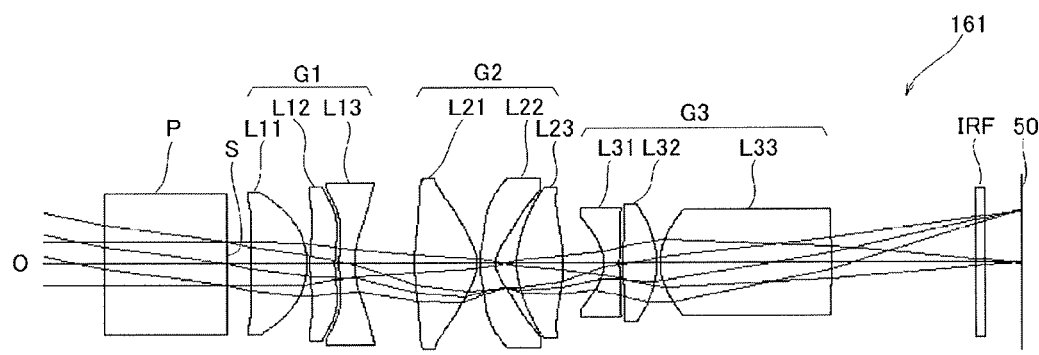
FIG. 13(b) is a section drawing at the medium magnification.
Figure 13C:
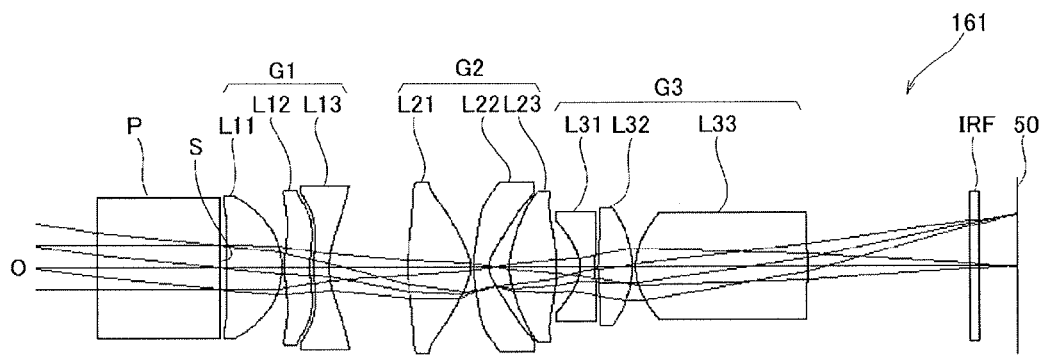
FIG. 13(c) is a section drawing at the telescopic end.

FIG. 13 shows the section drawing of the imaging optical system 161 of the present example. The imaging optical system 161 is an example of the imaging optical system 41 related to the fifth embodiment. As FIG. 13 shows, the imaging optical system 161 of the present example includes the first lens group G1 which has positive power and is movable after the prism P, the second lens group G2 which has positive power and is a fixed lens group after the first lens group G1, and the third lens group G3 which has positive power and is movable after the second lens group G2. The IR cut filter IRF and the image sensor 50 are located after the third lens group G3 in this order. The stop S is located at the rear surface of prism P.

The first lens group G1 comprises the first lens L11 which is convex at both surfaces, the second lens L12 which is meniscus with the front convex surface and the rear concave surface, and the third lens L13 which is meniscus with the front convex surface and the rear concave surface.

The second lens group G2 comprises the fourth lens L21 which is convex at both surfaces, the fifth lens L22 which is meniscus with the front convex surface and the rear concave surface, and the sixth lens L23 which is convex at both surfaces.

The third lens group G3 comprises the seventh lens L31 which is concave at both surfaces, the eighth lens L32 which is convex at both surfaces, and the ninth lens L33 which is convex at both surfaces. All lenses of the first lens group G1, the second lens group G2, and the third lens group G3 are aspheres.

In the imaging optical system 161 of the present example, the second lens group G2 is fixed and the zooming is done by linking and moving the first lens group G1 and the third lens group G3. The focusing is not done by mechanically but done by EDoF technology.

The following Table 12 shows the specification of the imaging optical system 161 shown at FIG. 13.

TABLE 12

Total specification
2 ω = 70°
Image size = 4.552 mm × 3.414 mm (Y = 2.845 mm)
FNO = 2.8
Zooming ratio = 2.8
F = −4.063 mm
L = 30.00 mm
Maximum ray height corresponding to the V-edge = 4.0 mm

| Lens data | | | | |
|---|---|---|---|---|
| m | r | d | nd | Vd |
| 1 | INFINITY | 4.0000000 | 1.51680 | 64.20 |
| 2 | INFINITY | 2.1462235 | | |
| 3 | 12.6001285 | 1.8618164 | 1.49700 | 81.61 |
| 4 | −2.4284901 | 0.1000558 | | |
| 5 | 5.1981612 | 0.8151989 | 1.72916 | 54.67 |
| 6 | 4.0406229 | 0.1317719 | | |
| 7 | 6.1672123 | 0.5000621 | 1.84666 | 23.78 |
| 8 | 2.5408776 | 0.6178767 | | |
| 9 | 7.0903482 | 2.0309815 | 1.72916 | 54.67 |
| 10 | −1.0205849 | 0.0999677 | | |
| 11 | 2.0981862 | 0.5002233 | 1.84666 | 23.78 |
| 12 | 0.6066385 | 0.6924815 | | |
| 13 | 1.8469872 | 1.5414085 | 1.83400 | 37.34 |
| 14 | −4.7293457 | 2.7002593 | | |
| 15 | −1.2056392 | 0.5003516 | 1.69895 | 30.05 |
| 16 | 5.2124305 | 0.1017965 | | |
| 17 | 5.6816834 | 1.1506070 | 1.72916 | 54.67 |
| 18 | −2.6666111 | 0.0999953 | | |
| 19 | 1.8941035 | 5.6019242 | 1.49700 | 81.61 |
| 20 | −10.9930092 | 3.3309219 | | |
| 21 | INFINITY | 0.3000000 | 1.51680 | 64.20 |
| 22 | INFINITY | 1.1735813 | | |

| Aspheric coefficients | | | | | | |
|---|---|---|---|---|---|---|
| m | K | A | B | C | D | E | F |
| 3 | 5.98E+00 | −4.41E−03 | −7.71E−03 | 1.97E−03 | −1.37E−04 | −6.81E−06 | 5.21E−07 |
| 4 | −1.16E−01 | −5.61E−04 | −1.53E−03 | −1.87E−04 | 1.72E−04 | −1.75E−05 | 5.97E−07 |
| 5 | 1.57E+00 | −3.55E−02 | 2.75E−03 | −1.57E−04 | 3.38E−05 | −2.42E−06 | 3.76E−08 |
| 6 | 1.06E+00 | −7.31E−02 | 1.31E−02 | −2.48E−03 | 3.04E−04 | −1.91E−05 | 5.35E−07 |
| 7 | 3.32E+00 | −4.80E−02 | 6.06E−03 | −1.04E−03 | 1.41E−04 | −9.36E−06 | 3.08E−07 |
| 8 | −8.13E−01 | −2.88E−02 | 3.10E−03 | −2.43E−04 | −4.12E−06 | 2.00E−06 | −4.74E−08 |
| 9 | 3.03E+00 | −2.37E−03 | −4.86E−03 | 1.04E−03 | −9.09E−05 | 4.25E−06 | −8.59E−08 |
| 10 | −4.63E+00 | −4.81E−03 | −1.96E−03 | 4.36E−04 | −2.27E−05 | 4.54E−07 | 2.84E−09 |
| 11 | −1.16E+01 | −5.12E−02 | 1.81E−02 | −2.13E−03 | 1.08E−04 | −2.70E−06 | 5.38E−08 |
| 12 | −2.40E+00 | −5.94E−02 | 2.02E−02 | −1.93E−03 | −8.55E−05 | 1.99E−05 | −6.24E−07 |
| 13 | −1.98E+01 | 4.41E−02 | −1.34E−02 | 1.89E−03 | −9.73E−05 | 1.37E−06 | −2.88E−08 |
| 14 | −6.18E+00 | 5.78E−03 | 2.74E−03 | −1.30E−03 | 2.79E−04 | −2.63E−05 | 9.19E−07 |
| 15 | −8.56E−01 | 7.68E−02 | −5.10E−02 | 4.08E−02 | −1.72E−02 | 3.54E−03 | −2.93E−04 |
| 16 | −1.75E+01 | −4.66E−02 | −1.47E−03 | 1.33E−02 | −5.40E−03 | 8.69E−04 | −5.00E−05 |
| 17 | −1.95E−01 | −4.35E−02 | 5.03E−03 | 4.24E−03 | −2.03E−03 | 3.50E−04 | −2.08E−05 |
| 18 | −1.60E+00 | −2.80E−04 | 9.32E−04 | −2.10E−05 | −3.07E−04 | 8.12E−05 | −5.27E−06 |
| 19 | −9.59E−01 | −8.20E−03 | 1.63E−03 | −2.44E−04 | −6.22E−05 | 3.61E−05 | −4.59E−06 |
| 20 | 4.92E+00 | 1.37E−03 | 2.10E−02 | −1.82E−02 | 1.01E−02 | −2.50E−03 | 2.43E−04 |

| Group separation | | | |
|---|---|---|---|
| m | W | M | T |
| 2 | 2.1462235 | 0.7959062 | 0.1997339 |
| 8 | 0.6178767 | 1.9681939 | 2.5643663 |
| 14 | 2.7002593 | 1.3499421 | 0.7537697 |
| 20 | 3.3309219 | 4.6812391 | 5.2774115 |

| FGi/|F| | | |
|---|---|---|
| i = 1 | i = 2 | i = 3 |
| 2.1442 | 0.5529 | 0.7597 |

It is shown that the values of (focal length of each lens group(FGi))/|total focal length at the wide end(F)| of the present example fulfill the condition of Table 5. The maximum ray height corresponding to the V-edge is 4.0 mm, which realizes the near value to the image size in the vertical direction, 3.414 mm. Therefore the thin imaging optical system which is thin in the direction of the object is realized. In addition, a small imaging optical system which can be embedded in a small electronic device with a limited space easily can be provided, because the total lens length L is as short as 30.00 mm.

Example 8

Figure 14A:
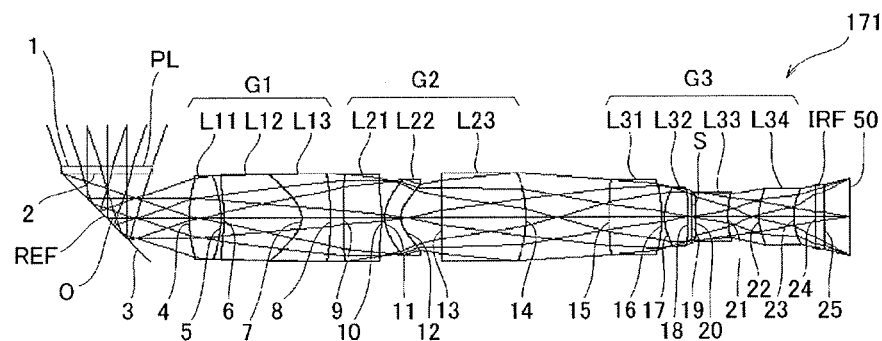
FIG. 14(a) is a section drawing at the wide end of the imaging optical system corresponding to the eighth example of the present invention.
Figure 14B:
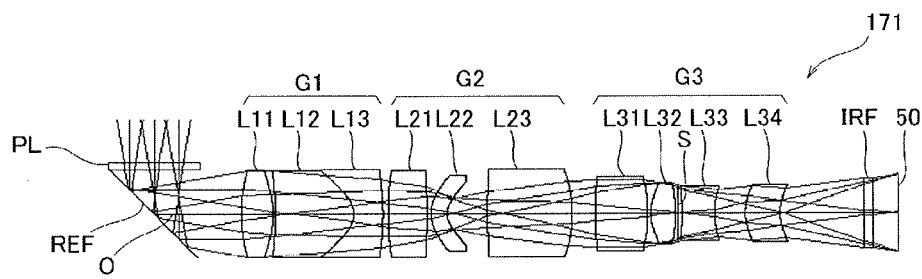
FIG. 14(b) is a section drawing at the medium magnification.
Figure 14C:
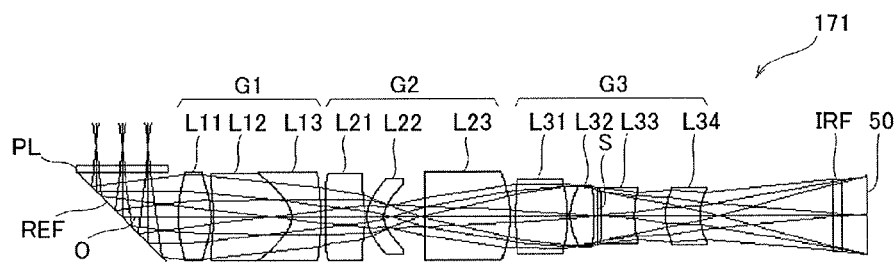
FIG. 14(c) is a section drawing at the telescopic end.

FIG. 14 shows the section drawing of the imaging optical system 171 of the present example. The clear aperture of each lens corresponds to the ray bundles at the V-edges. The ray bundle which is projected to the center of the image sensor 50 and the ray bundle corresponding to a V-edge are drawn. The imaging optical system 171 is an example of the imaging optical system 1 related to the first embodiment.

As FIG. 14 shows, the imaging optical system 171 of the present example includes a mirror REF as an optical axis bending means. The imaging optical system 171 includes a cover glass PL just before the mirror REF and the first lens group G1, the second lens group G2, and the third lens group G3 which have positive power and are movable after the mirror REF in this order. The IR cut filter IRF and the image sensor 50 are located after the third lens group G3 in this order. The stop S is located at the front end (object side) of the first lens group G1.

The first lens group G1 comprises the first lens L11 which is convex at both surfaces and the cemented lens of the second lens L12 and the third lens L13. The second lens L12 is meniscus with the front concave surface and the rear convex surface and the third lens L13 is meniscus with the front concave surface and the rear convex surface.

The second lens group G2 comprises the fourth lens L21 which is convex at both surfaces, the fifth lens L22 which is meniscus with the front convex surface and the rear concave surface, and the sixth lens L23 which is meniscus with the front concave surface and the rear convex surface.

The third lens group G3 comprises the seventh lens L31 which is convex at both surfaces, the eighth lens L32 which is convex at both surfaces, the ninth lens L33 which is concave at both surfaces, and the tenth lens L34 which is meniscus with the front convex surface and the rear concave surface.

In the imaging optical system 171 of the present example, the zooming is done by moving the first lens group G1, the second lens group G2, and the third lens group G3 and the focusing is done by moving the first lens group G1.

The following Table 13 shows the specification of the imaging optical system 171 shown at FIG. 14.

TABLE 13

Total specification
$2\omega = 70°$
Image size = 4.950 mm × 2.788 mm (Y = 2.845 mm)
FNO = 2.8
Zooming ratio = 2.8
F = −4.063 mm
L = 28.67 mm
Maximum ray height corresponding to the V-edge = 3.2 mm

| Lens data | | | | |
|---|---|---|---|---|
| m | r | d | nd | Vd |
| 1 | INFINITY | 0.3000000 | 1.51680 | 64.20 |
| 2 | INFINITY | 1.6000000 | | |
| 3 | INFINITY | 2.9730580 | | |
| 4 | 4.9818867 | 1.1575082 | 1.49700 | 81.61 |
| 5 | −3.0561432 | 0.1000132 | | |
| 6 | −6.2134953 | 2.8223455 | 1.52855 | 76.98 |
| 7 | −0.6917349 | 1.0495017 | 1.51742 | 52.15 |
| 8 | −8.6915278 | 0.4337890 | | |
| 9 | −32.7117591 | 1.4047689 | 1.84666 | 23.78 |
| 10 | −4.2995937 | 0.1004266 | | |
| 11 | 1.1376078 | 0.5858766 | 1.85135 | 40.10 |
| 12 | 0.6341717 | 1.4652108 | | |
| 13 | 28.0080988 | 3.0664414 | 1.56907 | 71.30 |
| 14 | −4.2278748 | 2.9871782 | | |
| 15 | 13.1884841 | 1.8791152 | 1.49700 | 81.61 |
| 16 | −8.2315354 | 0.1001129 | | |
| 17 | 1.6754824 | 0.8633798 | 1.49700 | 81.61 |
| 18 | −11.7006078 | 0.1028934 | | |
| 19 | INFINITY | 0.1652987 | | |
| 20 | −7.5423713 | 1.1681193 | 1.85026 | 32.27 |
| 21 | 3.2224631 | 1.1030914 | | |
| 22 | 1.6331296 | 1.2526082 | 1.59240 | 68.30 |
| 23 | 1.6905282 | 0.7882906 | | |
| 24 | INFINITY | 0.3000000 | 1.51680 | 64.20 |
| 25 | INFINITY | 0.9000528 | | |

| Aspheric coefficients | | | | | | |
|---|---|---|---|---|---|---|
| m | K | A | B | C | D | E | F |
| 4 | 5.56E−01 | −2.51E−04 | −2.95E−03 | 4.78E−04 | 4.09E−05 | −1.62E−05 | 9.63E−07 |
| 5 | −1.29E+00 | 2.07E−02 | −6.09E−03 | 1.30E−03 | 5.83E−05 | −4.21E−05 | 2.94E−06 |

TABLE 13-continued

| | | | | | | |
|---|---|---|---|---|---|---|
| 6 | −4.26E−01 | 2.18E−02 | −6.13E−03 | 2.67E−03 | −5.17E−04 | 4.50E−05 | −1.46E−06 |
| 7 | −1.68E+00 | 1.19E−02 | −1.25E−02 | 5.61E−04 | 4.54E−04 | −6.71E−05 | 2.72E−06 |
| 8 | −1.34E+00 | 9.33E−04 | 7.11E−04 | −1.83E−04 | 6.18E−05 | −6.22E−06 | 1.95E−07 |
| 9 | 2.22E+00 | 2.76E−02 | −2.58E−03 | −1.38E−04 | 7.25E−05 | −7.49E−06 | 1.81E−07 |
| 10 | −2.74E+00 | 4.54E−02 | −5.73E−03 | −4.08E−04 | 1.42E−04 | −1.11E−05 | 2.65E−07 |
| 11 | −9.34E−01 | −8.02E−02 | 2.72E−02 | −7.25E−03 | 6.92E−04 | −1.42E−05 | 4.28E−07 |
| 12 | −2.01E+00 | −9.21E−03 | 6.75E−03 | −2.46E−03 | −2.64E−04 | 1.20E−04 | −4.64E−06 |
| 13 | −5.01E+00 | 3.13E−03 | −3.06E−03 | 4.92E−04 | −1.94E−04 | 4.06E−05 | −1.48E−06 |
| 14 | 6.43E−01 | 2.18E−03 | −4.16E−04 | 1.83E−05 | 2.00E−05 | −2.92E−06 | 9.43E−08 |
| 15 | 1.97E+00 | 8.05E−03 | −8.22E−03 | 3.80E−03 | −1.60E−03 | 3.96E−04 | −3.52E−05 |
| 16 | −8.62E+00 | −4.50E−02 | 2.16E−02 | −1.93E−02 | 1.03E−02 | −2.52E−03 | 2.25E−04 |
| 17 | 4.47E−01 | −6.80E−02 | −3.61E−02 | 4.94E−02 | −7.41E−02 | 3.27E−02 | −6.08E−03 |
| 18 | −2.39E+00 | −6.38E−02 | 8.68E−02 | −1.02E−01 | 3.71E−02 | −9.34E−04 | −1.18E−03 |
| 20 | −1.04E+01 | −5.19E−02 | 1.41E−01 | −1.23E−01 | 5.85E−02 | −1.21E−02 | 1.25E−03 |
| 21 | 4.14E+00 | −6.21E−02 | 1.27E−01 | −7.35E−02 | 2.74E−03 | 2.50E−02 | −8.70E−03 |
| 22 | −3.83E+00 | −4.35E−04 | −1.43E−02 | 4.90E−03 | −5.70E−04 | 1.62E−05 | −4.14E−07 |
| 23 | −7.71E−01 | −5.80E−02 | 2.26E−03 | 6.82E−04 | −1.39E−04 | 6.86E−06 | −1.72E−07 |

| Group separation | | | |
|---|---|---|---|
| m | W | M | T |
| 3 | 2.9730580 | 3.1311670 | 2.0274400 |
| 8 | 0.4337890 | 0.2141259 | 0.1669172 |
| 14 | 2.9871782 | 0.8205715 | 0.2005387 |
| 23 | 0.7882906 | 3.0169956 | 4.7882534 |

| FGi/|F| | | |
|---|---|---|
| i = 1 | i = 2 | i = 3 |
| 1.1743 | 2.6418 | 0.7947 |

It is shown that the values of (focal length of each lens group(FGi))/|total focal length at the wide end(F)| of the present example fulfill the condition of Table 1. The maximum ray height corresponding to the V-edge is 3.2 mm, which realizes the near value to the image size in the vertical direction, 2.788 mm. Therefore the thin imaging optical system which is thin in the direction of the object is realized. In addition, a small imaging optical system which can be embedded in a small electronic device with a limited space easily can be provided, because the total lens length L is as short as 28.67 mm.

Common to all Examples

To summarize the above-stated examples, the examples of the imaging optical system 1 related to the first embodiment are Example 1, Example 5, and Example 8. The examples of the imaging optical system 11 related to the second embodiment are Example 2 and Example 4. In addition, the example of the imaging optical system 21 related to the third embodiment is Example 3, the example of the imaging optical system 31 related to the fourth embodiment is Example 6, and the example of the imaging optical system 41 related to the fifth embodiment is Example 7.

The examples where the stop S is located at the rear surface of the prism P are Example 1, Example 4, and Example 7. The examples where the stop P is located on the third lens group G3 are Example 2 and Example 5. The examples where the stop P is located on the first lens group G1 are Example 3, Example 6, and Example 8. In addition, Examples from 1 to 7 include a prism P as an optical axis bending means and Example 8 includes a mirror REF as an optical axis bending means. In Example 1 and Example 4, a fixed lens group is located after the third lens group G3. In addition, Example 4 and Example 5 show the cost can be reduced by using many plastic elements.

Regarding the total specification, the field angle of 70 degrees is realized for all examples. The image size is supposed 4.950 mm×2.788 mm for Example 8 and 4.552 mm×3.414 mm for all other examples. The FNO at the wide end is supposed 2.4 for Example 1 and 2.8 for all other examples. The zooming ratio is supposed 3.5 for Example 3 and 2.8 for all other examples. The total lens length is supposed less than or equal to 30.00 mm and the value of Example 1, Example 2, Example 5, and Example 8 is less than 30.00 mm. Therefore the reduction of the total size of the optical system is realized. The maximum ray height corresponding to the V-edge is 3.2 mm for Example 8, 3.4 mm for Example 1 and Example 4, 3.6 mm for Example 2 and Example 5, and 4.0 mm for Example 3, Example 6, and Example 7.

The above-stated variation of the total specification does not mean the difference of the ability to control the aberrations of the different types of the embodiment and the different position of the stop surface. The limit and the balance of the total specification should be investigated for each case based on the requirements on the performance, cost, size, and so on.

Regarding the values of (focal length of each lens group (FGi))/|total focal length at the wide end(F)|, as Table 14 shows, the first lens group G1 has the minimum of 0.8841 and the maximum of 2.1442 by summarizing the Example 1, Example 2, and from Example 4 to Example 8. The second lens group G2 has the minimum of 0.5529 and the maximum of 6.8326 and the third lens group G3 has the minimum of 0.6513 and the maximum of 0.9284. Therefore it is shown that the interval of (focal length of each lens group(FGi)/|total focal length at the wide end(F)| of each group G1, G2, and G3 is appropriate.

TABLE 14

|  | Min. | Max. |
|---|---|---|
| First lens group G1 | 0.8871 | 2.1442 |
| Second lens group G2 | 0.5529 | 6.8326 |
| Third lens group G3 | 0.6513 | 0.9284 |

APPLICABILITY IN THE INDUSTRY

The imaging optical system of the present invention can be used for the small electronic devices with a limited space for the optical system, such as a mobile phone and a small digital still camera. In addition, the imaging optical system of the present invention can be used for devices on which a lens is embedded other than the small electronic devices, and for the optical system of general cameras.

EXPLANATION OF SYMBOLS 1, 11, 21, 31, 41, 101, 111, 121, 131, 141, 151, 161, 171
    Imaging optical systems
50 Image sensor
G1 First lens group
G2 Second lens group
G3 Third lens group
GF Front lens group
GR Rear lens group
PL Cover glass
IRF IR cut filter
P Prism
REF Mirror
S Stop
II Intermediate image
O Central axis

What is claimed is:

1. An imaging optical system that has the function of the magnification adjustment, comprising in order from the object side of the imaging optical system:
    an optical axis bending means that has the function to bend the optical axis,
    the first lens group that has positive power and forms an intermediate real image,
    the second lens group that has positive power and refracts the off-axis ray bundles toward along the optical axis, and
    the third lens group that has positive power and relays said intermediate image onto the image sensor, and
    further comprising the feature such that:
    said magnification adjustment is done by moving said first lens group, said second lens group, and said third lens group.

2. An imaging optical system that has the function of the magnification adjustment, comprising in order from the object side of the imaging optical system:
    an optical axis bending means that has the function to bend the optical axis,
    the first lens group that has positive power and forms an intermediate real image,
    the second lens group that has positive power and refracts the off-axis ray bundles toward along the optical axis, and
    the third lens group that has positive power and relays said intermediate image onto the image sensor, and
    further comprising the feature such that:
    said magnification adjustment is done by moving said first lens group and said third lens group.

3. An imaging optical system according to claim 1, further comprising:
    the function of the focal point adjustment.

4. An imaging optical system according to claim 3, further comprising the feature such that:
    said focal point adjustment is done by moving said first lens group.

5. An imaging optical system that has the function of the magnification adjustment, comprising in order from the object side of the imaging optical system:
    an optical axis bending means that has the function to bend the optical axis,
    the first lens group that has positive power and forms an intermediate real image,
    the second lens group that has positive power and refracts the off-axis ray bundles toward along the optical axis, and
    the third lens group that has positive power and relays said intermediate image onto the image sensor, and
    further comprising the feature such that:
    said magnification adjustment is done by linking and moving said first lens group and said third lens group.

6. An imaging optical system according to claim 1, further comprising the feature such that:
    the value of the focal length of each lens group divided by the absolute value of the focal length of the total optical system at the wide end preferably satisfies,
    the minimum of 0.5 and the maximum of 3.0 for said first lens group,
    the minimum of 0.5 for said second lens group, and
    the minimum of 0.5 and the maximum of 1.5 for said third lens group.

7. An imaging optical system that has the function of the magnification adjustment, comprising in order from the object side of the imaging optical system:
    an optical axis bending means that has the function to bend the optical axis,
    the first lens group that has positive power and forms an intermediate real image,
    the second lens group that has positive power and refracts the off-axis ray bundles toward along the optical axis, and
    the third lens group that has positive power and relays said intermediate image onto the image sensor, and
    further comprising the feature such that:
    said first lens group and said second lens group construct the front lens group with the fixed distance between said first lens group and said second lens group,
    said third lens group constructs the rear lens group, and
    said magnification adjustment is done by moving said front lens group and said rear lens group.

8. An imaging optical system according to claim 7, further comprising the feature such that:
    the focal point adjustment is done by moving said front lens group.

9. An imaging optical system according to claim 7, further comprising the feature such that:
    the value of the focal length of each lens group divided by the absolute value of the focal length of the total optical system at the wide end preferably satisfies,
    the minimum of 0.5 and the maximum of 3.0 for said front lens group and
    the minimum of 0.5 and the maximum of 1.5 for said rear lens group.

10. An imaging optical system according to claim 1, further comprising the feature such that:
said optical axis bending means has the function to bend said optical axis such that the direction of the object and the short side of said image sensor are parallel.

11. An imaging optical system according to claim 10, further comprising the feature such that:
said optical axis bending means is a prism or a mirror.

12. An imaging optical system according to claim 1, further comprising the feature such that:
said first lens group, said second lens group, and said third lens group are a single lens or a lens group.

13. An imaging optical system according to claim 1, further comprising the feature such that:
a fixed lens or a fixed lens group are included after said third lens group.

14. An imaging optical system according to claim 2, further comprising:
the function of the focal point adjustment.

15. An imaging optical system according to claim 2, further comprising the feature such that:
the value of the focal length of each lens group divided by the absolute value of the focal length of the total optical system at the wide end preferably satisfies,
the minimum of 0.5 and the maximum of 3.0 for said first lens group,
the minimum of 0.5 for said second lens group, and
the minimum of 0.5 and the maximum of 1.5 for said third lens group.

16. An imaging optical system according to claim 5, further comprising the feature such that:
the value of the focal length of each lens group divided by the absolute value of the focal length of the total optical system at the wide end preferably satisfies,
the minimum of 0.5 and the maximum of 3.0 for said first lens group,
the minimum of 0.5 for said second lens group, and
the minimum of 0.5 and the maximum of 1.5 for said third lens group.

17. An imaging optical system according to claim 8, further comprising the feature such that:
the value of the focal length of each lens group divided by the absolute value of the focal length of the total optical system at the wide end preferably satisfies,
the minimum of 0.5 and the maximum of 3.0 for said front lens group and
the minimum of 0.5 and the maximum of 1.5 for said rear lens group.

18. An imaging optical system according to claim 2, further comprising the feature such that:
said optical axis bending means has the function to bend said optical axis such that the direction of the object and the short side of said image sensor are parallel.

19. An imaging optical system according to claim 5, further comprising the feature such that:
said optical axis bending means has the function to bend said optical axis such that the direction of the object and the short side of said image sensor are parallel.

20. An imaging optical system according to claim 7, further comprising the feature such that:
said optical axis bending means has the function to bend said optical axis such that the direction of the object and the short side of said image sensor are parallel.

21. An imaging optical system according to claim 2, further comprising the feature such that:
said first lens group, said second lens group, and said third lens group are a single lens or a lens group.

22. An imaging optical system according to claim 5, further comprising the feature such that:
said first lens group, said second lens group, and said third lens group are a single lens or a lens group.

23. An imaging optical system according to claim 7, further comprising the feature such that:
said first lens group, said second lens group, and said third lens group are a single lens or a lens group.

24. An imaging optical system according to claim 2, further comprising the feature such that:
a fixed lens or a fixed lens group are included after said third lens group.

25. An imaging optical system according to claim 5, further comprising the feature such that:
a fixed lens or a fixed lens group are included after said third lens group.

26. An imaging optical system according to claim 7, further comprising the feature such that:
a fixed lens or a fixed lens group are included after said third lens group.

27. An imaging optical system according to claim 14, further comprising the feature such that:
said focal point adjustment is done by moving said first lens group.

* * * * *